US011867525B2

(12) United States Patent
Sharifi et al.

(10) Patent No.: US 11,867,525 B2
(45) Date of Patent: Jan. 9, 2024

(54) SHARING A NAVIGATION SESSION TO MINIMIZE DRIVER DISTRACTION

(71) Applicant: GOOGLE LLC, Mountain View, CA (US)

(72) Inventors: Matthew Sharifi, Mountain View, CA (US); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 428 days.

(21) Appl. No.: 17/273,676

(22) PCT Filed: Dec. 16, 2020

(86) PCT No.: PCT/US2020/065197
§ 371 (c)(1),
(2) Date: Mar. 4, 2021

(87) PCT Pub. No.: WO2022/132139
PCT Pub. Date: Jun. 23, 2022

(65) Prior Publication Data
US 2022/0412768 A1   Dec. 29, 2022

(51) Int. Cl.
*G01C 21/36*  (2006.01)
*G06N 20/00*  (2019.01)
*G06N 20/20*  (2019.01)

(52) U.S. Cl.
CPC ....... *G01C 21/3688* (2013.01); *G01C 21/367* (2013.01); *G01C 21/3661* (2013.01); *G06N 20/00* (2019.01)

(58) Field of Classification Search
CPC ........ G01C 21/00; G01C 21/26; G01C 21/32; G01C 21/34; G01C 21/36; G06N 20/20
See application file for complete search history.

(56) References Cited

U.S. PATENT DOCUMENTS

| 8,930,122 B2 | 1/2015 | Burke et al. |
| 9,058,703 B2 | 6/2015 | Ricci |

(Continued)

FOREIGN PATENT DOCUMENTS

| EP | 2290322 A1 | 3/2011 |
| TW | 269023 B | 1/1996 |

(Continued)

OTHER PUBLICATIONS

International Search Report and Written Opinion for Application No. PCT/US2020/065197, dated Nov. 4, 2021.

*Primary Examiner* — Tan Q Nguyen
(74) *Attorney, Agent, or Firm* — MARSHALL, GERSTEIN & BORUN LLP

(57) ABSTRACT

A first computing device may implement a method for sharing a navigation session to minimize driver distraction. The method includes requesting access to a shared navigation session synchronized with a navigation session at a second computing device indicative of a navigation route, and the navigation session includes route data. In response to receiving access to the shared navigation session, the first computing device may receive synchronized route data indicative of the navigation route at the second computing device. The method further comprises obtaining one or more first navigation instructions corresponding to the synchronized route data including at least one navigation instruction that augments or is output in a different manner than one or more second navigation instructions output at the second computing device, and outputting the one or more first navigation instructions.

20 Claims, 9 Drawing Sheets

(56) References Cited

U.S. PATENT DOCUMENTS

| | | | |
|---|---|---|---|
| 9,068,847 B2 | 6/2015 | Krishnaswamy et al. | |
| 9,363,324 B2 | 6/2016 | Coch et al. | |
| 10,527,435 B2 | 1/2020 | Biswas et al. | |
| 11,615,711 B2* | 3/2023 | Ahmed | G06F 18/253 |
| | | | 701/49 |
| 2006/0089786 A1* | 4/2006 | Soehren | G01C 21/20 |
| | | | 340/995.12 |
| 2009/0276154 A1 | 11/2009 | Subramanian et al. | |
| 2011/0153629 A1 | 6/2011 | Lehmann et al. | |
| 2015/0088421 A1* | 3/2015 | Foster | G01C 21/3688 |
| | | | 709/201 |
| 2016/0003623 A1* | 1/2016 | Venkatraman | H04W 4/023 |
| | | | 701/410 |
| 2017/0215031 A1* | 7/2017 | Harding | G01C 21/3667 |
| 2018/0267942 A1* | 9/2018 | Zhi | H04L 51/222 |
| 2020/0084193 A1* | 3/2020 | Beaurepaire | G05D 1/0287 |
| 2022/0406311 A1* | 12/2022 | Fang | G10L 15/04 |

FOREIGN PATENT DOCUMENTS

| | | |
|---|---|---|
| TW | 374255 B | 11/1999 |
| WO | WO-2015/103457 A2 | 7/2015 |

* cited by examiner

SHARING A NAVIGATION SESSION TO MINIMIZE DRIVER DISTRACTION

FIELD OF THE DISCLOSURE

The present disclosure relates to navigation sessions and, more particularly, to minimizing driver distraction during a navigation session by sharing the navigation session with a passenger.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request navigation directions that guide the user to a desired destination. A variety of software applications capable of executing on computers, smartphones, devices embedded in vehicles, etc. are available that can provide step-by-step navigation instructions. In many scenarios, while a driver's device is performing driving navigation, other passengers are also present in the vehicle that have their own devices capable of performing driving navigation. These passengers may serve as "co-pilots" during navigation by helping the driver interpret directions, identify turns, search for information related to the route, etc. However, a passenger conventionally executes a separate navigation session from the driver. As a result, the two devices independently provide navigation instructions to the destination, which can create further confusion for both the driver and the passenger. For example, the two devices may provide duplicative instructions and emit audio instructions simultaneously, which may cause the user(s) to have difficulty hearing the overlapping instructions. Moreover, the passenger may lack access to information related to the navigation route because the passenger's navigation session differs from the driver's navigation session.

SUMMARY

Using the techniques of this disclosure, a passenger's computing device may join a navigation session initiated by a driver's computing device, and the passenger's computing device may receive supplemental navigation instructions not received by the driver's computing device. A passenger computing device may request access to a shared navigation session that is synchronized with a navigation session initiated by a driver computing device. The navigation session may be indicative of a navigation route and may include route data. In response to receiving access to the shared navigation session, the passenger computing device may receive synchronized route data indicative of the navigation route at the driver computing device. The passenger computing device may also receive a set of passenger navigation instructions corresponding to the synchronized route data that includes at least one navigation instruction(s) that augments or is output differently from the navigation instructions output at the driver computing device. Each of the instructions in the set of passenger navigation instructions may be output at the passenger computing device.

In some implementations, the driver's computing device, the passenger's computing device, or a remote server device may segment a set of navigation instructions into the set of passenger navigation instructions and a set of driver navigation instructions, where a navigation instruction(s) in the set of passenger navigation instructions correspond(s) to a navigation instruction(s) in the set of driver navigation instructions. For example, the passenger computing device may receive the set of navigation instructions and apply a machine learning-based text summarization algorithm to generate the passenger navigation instruction(s). The passenger computing device may also generate the passenger navigation instruction(s) at a different level of detail than the corresponding driver navigation instructions.

For example, a driver navigation instruction obtained by the driver computing device may read "Turn left in 100 m," and may be audibly communicated to the driver by a speaker of the driver computing device. A navigation instruction obtained by the passenger computing device that corresponds to the driver navigation instruction may read "Turn left in 100 m at the intersection with a large tree on the corner opposite a drug store," and may be visually displayed to the passenger on a display of the passenger computing device. As another example, a driver navigation instruction obtained by the driver computing device may audibly communicate "Continue on I-xx for 100 miles" to the driver. A navigation instruction obtained by the passenger computing device that corresponds to the driver navigation instruction may feature traffic information along the navigation route (e.g., along I-xx), and may pose an alternative route to the passenger by stating "There's congestion on I-xx in 10 miles. Do you want to take a shortcut which involves smaller roads?" In response, the passenger may approve the route change, the driver may verbally or otherwise consent to the route change, and the shared navigation session may update the navigation route to feature the alternative route for presentation to both the passenger and the driver.

In other implementations, the driver computing device may display the route data in accordance with driver display configurations, and the passenger computing device may display the synchronized route data in accordance with passenger display configurations. Further, a display configuration of the driver display configurations may be different from the passenger display configurations, such that the passenger computing device may display different and/or additional aspects of the navigation route to the passenger. For example, the driver computing device may display the navigation route to the driver, and the passenger computing device may display the navigation route, stop-off points, points of interest, alternative routes, information related to the navigation route (e.g., step-by-step navigation, distances, times, etc.), and/or any other suitable information to the passenger. In some embodiments, the passenger computing device may further allow the passenger to control aspects of the shared navigation session by placing stop-off points along the navigation route, determining alternative routes, etc.

Aspects of the present disclosure also provide a technical solution to the problem of navigation instructions distracting a driver by allowing a passenger's device to join a synchronized navigation session with the driver's device through a single connection to a navigation server. For example, the driver's device may communicate with a remote navigation server to obtain a navigation route and the associated route data. The passenger's device may communicate with the driver's device (e.g., via Bluetooth, physical USB port, WiFi, etc.) to receive synchronized route data without establishing a connection to the remote navigation server. The driver's device may receive navigation instructions from the remote navigation server, and either the driver's device or the passenger's device may segment and/or summarize the navigation instructions for presentation at each respective device. In this manner, the two devices may each receive synchronized route data without causing unnecessary network traffic and occupying limited navigation server bandwidth. Further, the two devices can collaborate with each other such that, for example, only the driver's device audibly presents navigation instructions while the passenger's device visibly displays navigation instructions for the passenger.

One example embodiment of the techniques of this disclosure is a method for providing a passenger access to a shared navigation session. The method comprises a first computing device requesting access to a shared navigation session synchronized with a navigation session at a second computing device indicative of a navigation route, and the navigation session includes route data. In response to receiving access to the shared navigation session, one or more processors may receive synchronized route data indicative of the navigation route at the second computing device. The one or more processors may further obtain one or more first navigation instructions corresponding to the synchronized route data. The one or more first navigation instructions may include at least one navigation instruction that augments or is output in a different manner than one or more second navigation instructions output at the second computing device. The method may further comprise outputting, by the one or more processors of the first computing device, the one or more first navigation instructions.

Another example embodiment is a first computing device for providing a passenger access to a shared navigation session initiated by a second computing device. The first computing device may comprise one or more processors and a computer-readable memory, optionally a non-transitory computer-readable memory, coupled to the one or more processors. The memory may store instructions thereon that, when executed by the one or more processors, cause the first computing device to request access to a shared navigation session synchronized with a navigation session at a second computing device indicative of a navigation route, and the navigation session includes route data. In response to receiving access to the shared navigation session, the first computing device may receive synchronized route data indicative of a navigation route at the second computing device, and obtain one or more first navigation instructions corresponding to the synchronized route data that includes at least one navigation instruction that augments or is output in a different manner than one or more second navigation instructions output at the second computing device. The first computing device may further present the one or more first navigation instructions.

Yet another example embodiment is a method in a first computing device for providing a passenger access to a shared navigation session initiated by the first computing device. The method may comprise outputting, by one or more processors of the first computing device, one or more first navigation instructions for a navigation session indicative of a navigation route, and the navigation session includes route data. Further, the method may comprise receiving, by one or more processors from a second computing device, a request for access to the navigation session via a shared navigation session, and providing, by the one or more processors, access to the second computing device to the shared navigation session. The one or more processors may then transmit the route data to the second computing device, and obtain one or more second navigation instructions including at least one navigation instruction that augments or is output in a different manner than one or more first navigation instructions. The method may further comprise transmitting, by the one or more processors, the one or more second navigation instructions to the second computing device.

DETAILED DESCRIPTION

Overview

Figure 1A:
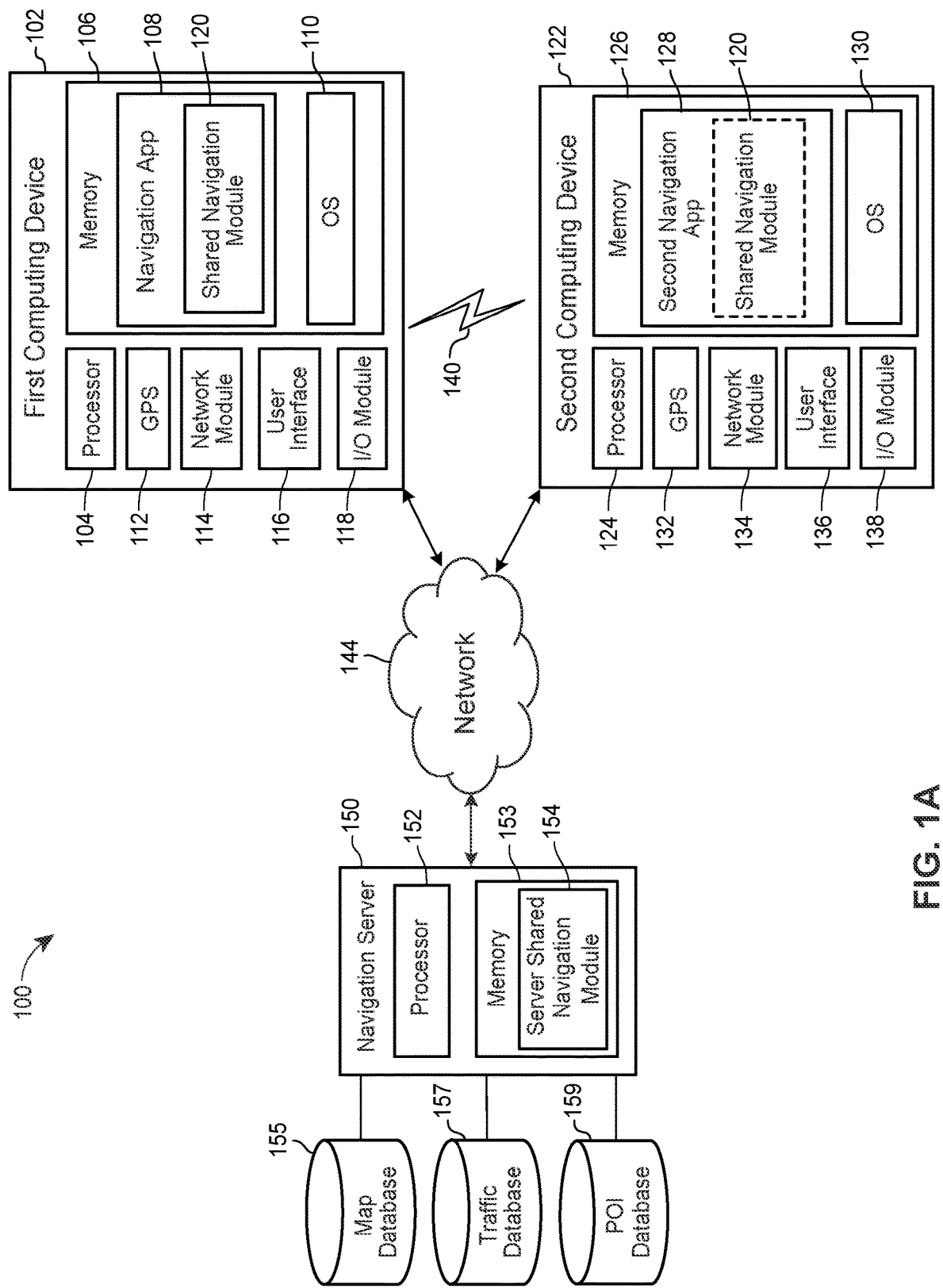
FIG. 1A is a block diagram of an example communication system in which techniques for sharing a navigation session to minimize driver distraction can be implemented.

Generally speaking, a passenger's computing device may join a navigation session initiated by a driver's computing device, and the passenger's computing device may receive supplemental navigation instructions which are not received at the driver's computing device. A passenger computing device may request access to a shared navigation session that is synchronized with a navigation session initiated by a driver computing device. The navigation session may be indicative of a navigation route and may include route data. In response to receiving access to the shared navigation session, the passenger computing device may receive synchronized route data indicative of the navigation route at the driver computing device. The passenger computing device may also receive a set of passenger navigation instructions corresponding to the synchronized route data that includes at least one navigation instruction(s) that augments or is output differently from each navigation instruction output at the driver computing device. Each of the instructions in the set of passenger navigation instructions may be output at the passenger computing device.

Aspects of the present disclosure provide a technical solution to the problem of navigation instructions distracting a driver by allowing a passenger's device to join a synchronized navigation session with the driver's device through a single connection to a navigation server. For example, the driver's device may communicate with a remote navigation server to obtain a navigation route and the associated route data. The passenger's device may communicate with the driver's device (e.g., via Bluetooth, physical USB port, etc.) to receive synchronized route data without establishing a connection to the remote navigation server. The driver's device may receive navigation instructions from the remote navigation server, and either the driver's device or the passenger's device may segment and/or summarize the navigation instructions for presentation at each respective device. In this manner, the two devices may each receive synchronized route data without causing unnecessary network traffic and occupying limited navigation server bandwidth. Further, the two devices can collaborate with each other such that, for example, only the driver's device audibly presents navigation instructions while the passenger's device visibly displays navigation instructions for the passenger. The present technique thus allows a single navigation session to be shared between a driver's device and a passenger's device and suitable navigation information of the navigation session to be output by each respective device. This helps provide a more informative and safer navigation experience, since the passenger is able to benefit from a wealth of navigation information which might otherwise distract the driver. Furthermore, it enables only one device (e.g. the driver's device) to be connected to a navigation server in order to obtain the navigation information, thereby making more efficient use of network resources. The present technique thus enables a safer, more informative and more network efficient electronic navigation session.

Example Hardware and Software Components

Referring first to FIG. 1A, an example communication system 100 in which the techniques of this disclosure can be implemented includes a first computing device 102 (also referred to herein as a first device). The first device 102 may be a portable device such as a smart phone or a tablet computer, for example. The first device 102 may also be a laptop computer, a desktop computer, a personal digital assistant (PDA), a wearable device such as a smart watch or smart glasses, etc. In some embodiments, the first device 102 may be removably mounted in a vehicle, embedded into a vehicle, and/or may be capable of interacting with a head unit of a vehicle to provide navigation instructions, as described in more detail with reference to FIG. 1B.

The first device 102 may include one or more processor(s) 104 and a memory 106 storing machine-readable instructions executable on the processor(s) 104. The processor(s) 104 may include one or more general-purpose processors (e.g., CPUs), and/or special-purpose processing units (e.g., graphical processing units (GPUs)). The memory 106 can be, optionally, a non-transitory memory and can include one or several suitable memory modules, such as random access memory (RAM), read-only memory (ROM), flash memory, other types of persistent memory, etc. The memory 106 may store instructions for implementing a navigation application 108 that can provide navigation directions (e.g., by displaying directions or emitting audio instructions via the first device 102), display an interactive digital map, request and receive routing data to provide driving, walking, or other navigation directions, provide various geo-located content such as traffic, point-of-interest, and weather information, etc.

Further, the first navigation application 108 may include a shared navigation module 120 configured to implement and/or support the techniques of this disclosure for sharing a navigation session of the first device 102 with devices in proximity of the first device 102, exchanging information with devices to generate shared navigation instructions, configuring the first navigation application 108 to present navigation instructions, generating additional instructions, etc. In some scenarios, the shared navigation module 120 may include a separation and summarization algorithm configured to separate and summarize navigation instructions for first and second sets of navigation instructions to be output at the first and second devices 102, 122, respectively. The separation and summarization algorithm may include a machine learning-based text summarization technique, a rule-based technique, and/or any other suitable technique.

It is noted that although FIG. 1A illustrates the first navigation application 108 as a standalone application, the functionality of the first navigation application 108 also can be provided in the form of an online service accessible via a web browser executing on the first device 102, as a plug-in or extension for another software application executing on the first device 102, etc. The first navigation application 108 generally can be provided in different versions for different operating systems. For example, the maker of the first device 102 can provide a Software Development Kit (SDK) including the first navigation application 108 for the Android™ platform, another SDK for the iOS™ platform, etc.

The memory 106 may also store an operating system (OS) 110, which can be any type of suitable mobile or general-purpose operating system. The first device 102 may further include a global positioning system (GPS) 112 or another suitable positioning module, a network module 114, a user interface 116 for displaying map data and directions, and input/output (I/O) module 118. The network module 114 may include one or more communication interfaces such as hardware, software, and/or firmware of an interface for enabling communications via a cellular network, a WiFi network, or any other suitable network such as a network 144, discussed below. The I/O module 118 may include I/O devices capable of receiving inputs from, and presenting outputs to, the ambient environment and/or a user. The I/O module 118 may include a touch screen, display, keyboard, mouse, buttons, keys, microphone, speaker, etc. In various implementations, the first device 102 can include fewer components than illustrated in FIG. 1A or, conversely, additional components.

The communication system 100 also includes a second computing device 122 (also referred to herein as a second device). The second device 122 may be generally similar to the first device 102. In particular, the second device 122 may include one or more processor(s) 124, a memory 126, a GPS 132, a network module 134, a user interface 136, and an I/O module 138, which may be similar to the processor(s) 104, memory 106, GPS 112, network module 114, user interface 116, and I/O module 118, respectively. The second device 122 may be manufactured by a different maker than the first device 102. For example, a maker of the first device 102 may be Google™, and a maker of the second device 102 may be Apple™. Similarly, an OS 130 stored by the memory 126 may be different from the OS 110. It should be noted that while FIG. 1A depicts two client devices, the first device 102 and the second device 122, the techniques of this disclosure can be applied in scenarios with two or more client devices.

The memory 126 also stores a navigation application 128. The navigation application 128, for example, may be a different navigation application from the navigation application 108, or may be the same as the navigation application 108. For instance, the navigation application 108 may be similar to the navigation application 108, but configured for the OS 130. Further, the navigation application 128 may, or may not, store a shared navigation module 120 similar to the shared navigation module 120. As discussed below, different techniques of this disclosure may be appropriate depending on whether the second device 122 implements the shared navigation module 120.

The first device 102 and the second device 122 may establish communication via a communication link 140. The first and second devices 102, 122, for example, may discover each other via the communication link 140. The communication link 140 may be any communication link suitable for short-range communications and may conform to a communication protocol such as, for example, Bluetooth™ (e.g., BLE), Wi-Fi (e.g., Wi-Fi Direct), NFC, ultrasonic signals, etc. Additionally or alternatively, the communication link 140 may be, for example, WiFi, a cellular communication link (e.g., conforming to 3G, 4G, or 5G standards), etc. In some scenarios, the communication link 140 may include a wired connection. In addition to discovering each other, the first and second devices 102, 122 may exchange information via the communication link 140.

The first device 102 and the second device 102, respectively, may communicate with a navigation server 150 via a network 144. The network 144 may include one or more of an Ethernet-based network, a private network, a cellular network, a local area network (LAN), and/or a wide area network (WAN), such as the Internet. In some scenarios, the communication link 140 may be a communication link over the network 144. The navigation application 108, 128 may receive map data, navigation directions, and other geo-located content from the navigation server 150. Further, the navigation application 108 may access map, navigation, and geo-located content that is stored locally at the first device 102, and may access the navigation server 150 periodically to update the local data or during navigation to access real-time information, such as real-time traffic data. Similarly, the navigation application 128 may access map, navigation, and geo-located content that is stored locally at the second device 122, and may access the navigation server 150 periodically to update the local data or during navigation to access real-time information, such as real-time traffic data.

The navigation server 150 includes one or more processor(s) 152 and a memory 153 storing computer-readable instructions executable by the processor(s) 152. The memory 153 may store a server shared navigation module 154. The server shared navigation module 154 may support similar functionalities as the shared navigation module 120 from the server-side and may facilitate coordination of the first device 102 and the second device 122. For example, the first device 102 may provide the navigation server 150 with navigation information received from the second device 122 and request that the server shared navigation module 154 generate a shared set of navigation instructions.

The server shared navigation module 154 and the shared navigation module 120 can operate as components of a shared navigation system. Alternatively, the entire functionality of the server shared navigation module 154 can be implemented in the shared navigation module 120.

The navigation server 150 may be communicatively coupled to various databases, such as a map database 155, a traffic database 157, and a point-of-interest (POI) database 159, from which the navigation server 150 can retrieve navigation-related data. The map database 155 may include map data such as map tiles, visual maps, road geometry data, road type data, speed limit data, etc. The traffic database 157 may store historical traffic information as well as real-time traffic information. The POI database 159 may store descriptions, locations, images, and other information regarding landmarks or points-of-interest. While FIG. 1A depicts databases 155, 157, and 159, the navigation server 150 may be communicatively coupled to additional, or conversely, fewer, databases. For example, the navigation server 150 may be communicatively coupled to a database storing weather data.

Figure 1B:
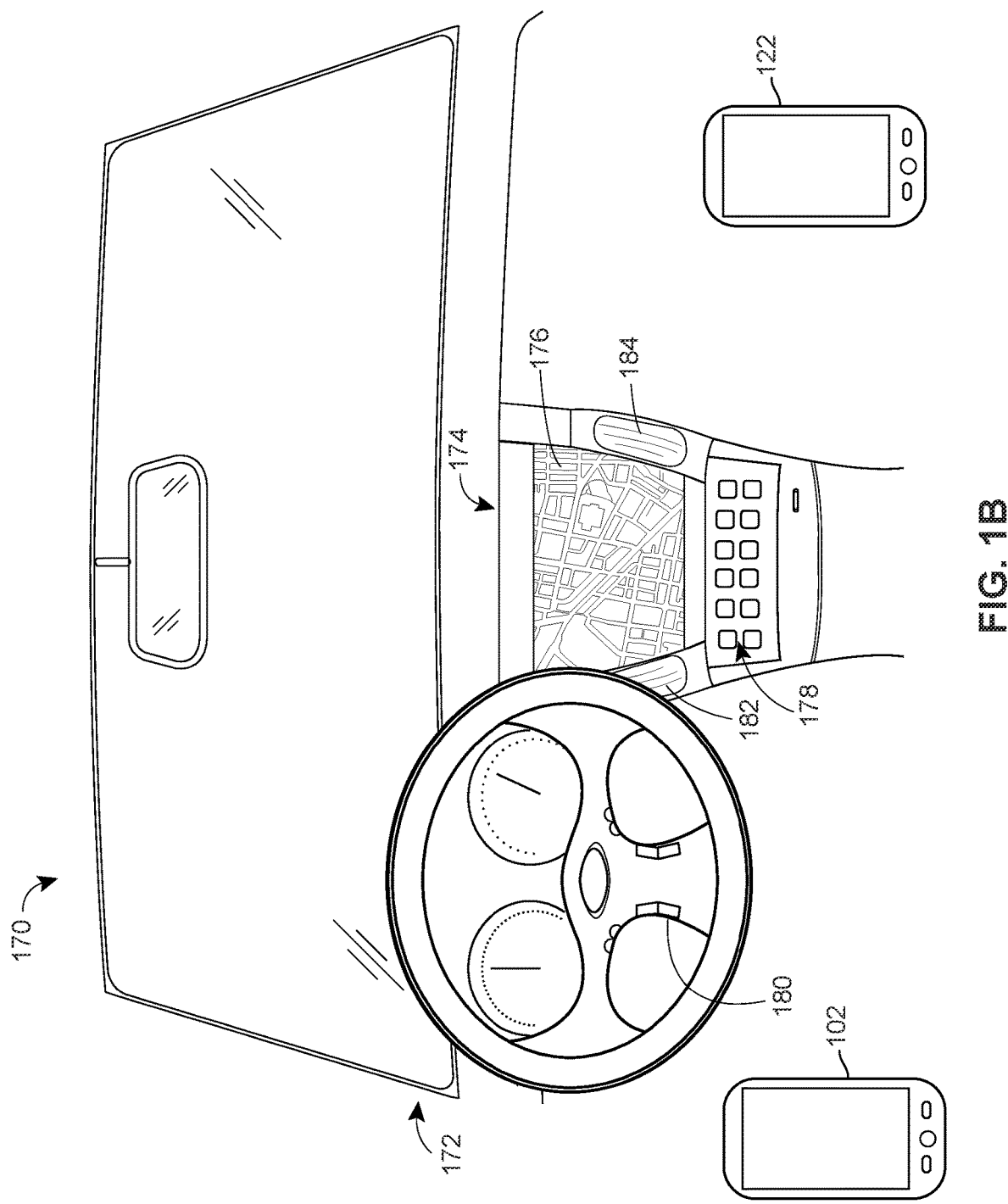
FIG. 1B illustrates an example vehicle environment in which the techniques of the present disclosure can be used to share a navigation session to minimize driver distraction.

Turning to FIG. 1B, the first device 102 and the second device 122 may interact in a vehicle environment 170. The first device 102 and the second device 122 may both be located within a vehicle 172. While FIG. 1B depicts the first and second devices 102 and 122 as smartphones, this is for ease of illustration only. The first and second devices 102 and 122 may be different types of devices, and may include any suitable type of portable or non-portable computing devices. The vehicle 172 may include a head unit 174. In some implementations, the head unit 174 may include one of the first or the second devices 102 or 122. Even if the head unit 174 does not include the first device 102 or the second device 122, the first device 102 or the second device 122 may communicate (e.g., via a wireless or wired connection) with the head unit 174. The first device 102 or the second device 122 may transmit navigation information such as maps or audio instructions to the head unit 174 for the head unit 174 to display or emit, and a user may interact with the first device 102 or the second device 122 by interacting with head unit controls. In addition, the vehicle 172 may provide the communication link 140. For example, the communication link 140 may include a wired connection to the vehicle 172 (e.g., via a USB connection).

Accordingly, the head unit 174 may include a display 176 for outputting navigation information such as a digital map. The display 176 in some implementations includes a software keyboard for entering text input, which may include the name or address of a destination, point of origin, etc. Hardware input controls 178 and 180 on the head unit 174 and the steering wheel, respectively, can be used for entering alphanumeric characters or to perform other functions for requesting navigation directions. The head unit 174 also can include audio input and output components such as a microphone 182 and speakers 184, for example. As an example, the second device 122 may communicatively connect to the head unit 174 (e.g., via Bluetooth™, WiFi, cellular communication protocol, wired connection, etc.) or may be included in the head unit 174. The second device 122 may present map information via the display 176 of the head unit 174, emit audio instructions for navigation via the speakers 184, and receive inputs from a user via the head unit 174 (e.g., via a user interacting with the input controls 178 and 180, the display 176, or the microphone 182).

In another example, the first device 102 may communicatively connect to the head unit 174 or may be included in the head unit 174, and the second device 122 may not be communicatively coupled or otherwise included in the head unit 174. Accordingly, the first device 102 may present map information via the display 176 of the head unit 174, emit audio instructions for navigation via the speakers 184, and receive inputs from a user via the head unit 174 (e.g., via a user interacting with the input controls 178 and 180, the display 176, or the microphone 182). By contrast, the second device 122 may locally display map information and navigation instructions on a display of the second device 122, may emit any audio instructions via a speaker of the second device 122, and/or receive inputs from a user via a user interface, microphone, and/or any other suitable means of the second device 122. In this manner, a driver utilizing the first device 102 may receive audible instructions and view visually displayed graphical representations of the map information and navigation instructions using the vehicle head unit 174 to increase the audio levels of the audibly communicated instructions and the visual clarity of the graphically displayed map information and navigation instructions. Additionally, a passenger utilizing the second device 122 may eliminate conflicting audible navigation instructions and/or otherwise minimize distractions for the driver by receiving the map information and navigation instructions through the second device 122 directly.

Example Navigation Displays During Scenarios Involving Shared Navigation Sessions The techniques of this disclosure for providing navigation directions are discussed below with reference to navigation displays illustrated in FIGS. 2-6. Throughout the description of FIGS. 2-6, actions described as being performed by the first device 102 may, in some implementations, be performed by the second device 122 or may be performed by the first and second devices 102, 122 in parallel. For example, either the first or the second device 102, 122 may detect the other device is in proximity and implementing a navigation session, either the first or the second device 102, 122 may act as the primary device or select which device will act as the primary device, and/or either the first or the second device 102, 122 may determine shared navigation instructions for a joint route to the destination or direct the other device to play audio instructions.

Figure 2:
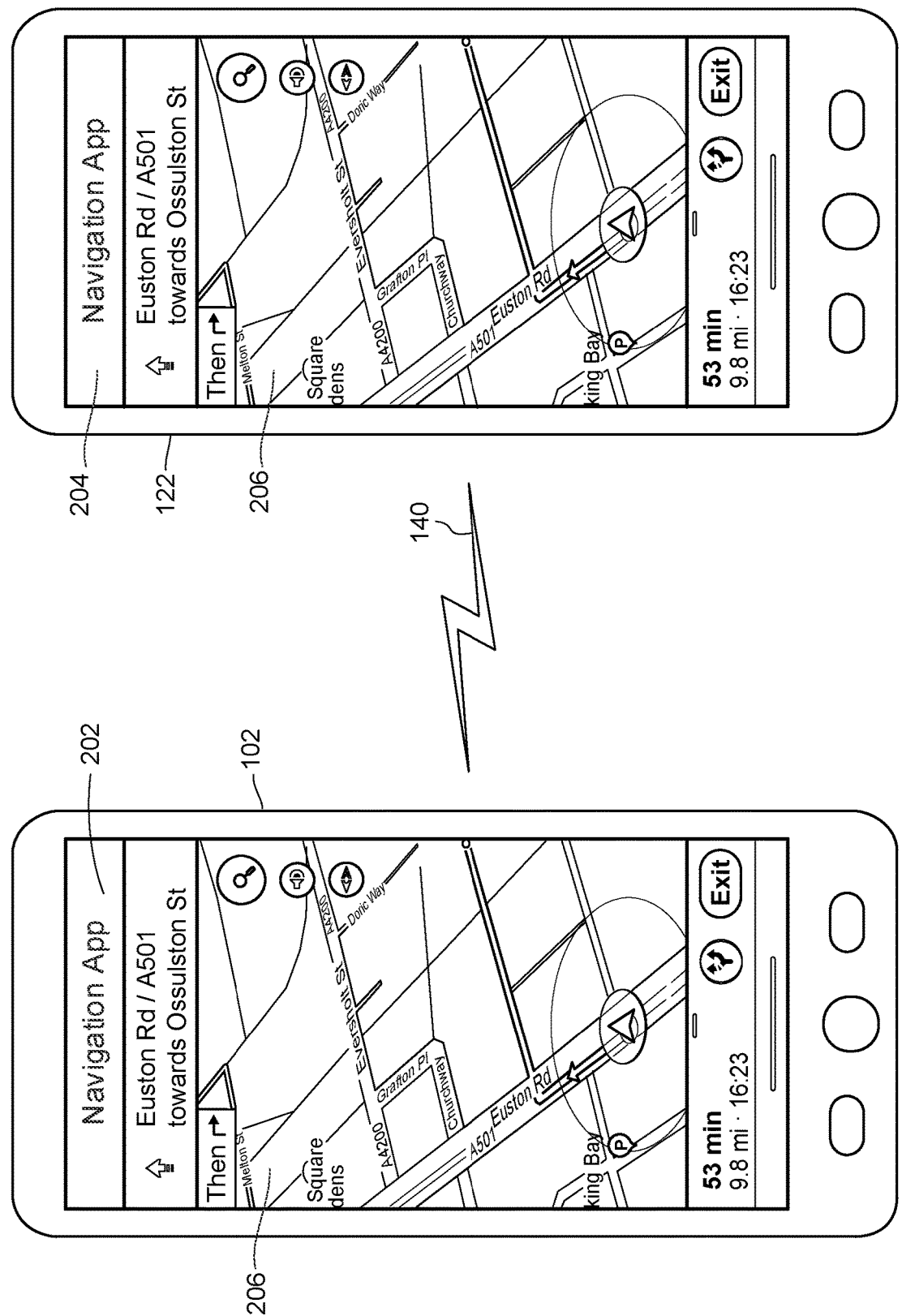
FIGS. 2-6 illustrate example navigation displays of the first computing device and the second computing device after forming a connection to share a navigation session over the communication link.

Referring to FIG. 2, the first device 102 may implement the navigation application 108 and display a graphical user interface (GUI) 202 of the navigation application 108. Similarly, the second device 122 may implement the navigation application 128 and display a GUI 204 of the navigation application 128. The two devices 102, 122 simultaneously implement navigation sessions in proximity with each other. For example, the two devices 102, 122 may both be located in the same vehicle 172.

More particularly, the first device 102 initiates a navigation session for providing a first set of navigation instructions from a starting location to a destination location (e.g., in response to a request received at the first device 102 from a user interacting with the first device 102). The first set of navigation instructions may include step-by-step directions for reaching the destination location along a first route. During the navigation session, the first device 102 may display, via the GUI 202, a map depicting a location of the first device 102, a heading of the first device 102, an estimated time of arrival, an estimated distance to the destination, an estimated time to the destination, a current navigation direction, one or more upcoming navigation directions of the first set of navigation instructions, one or more user-selectable options for changing the display or adjusting the navigation directions, etc. The first device 102 may also emit audio instructions corresponding to the first set of navigation instructions.

The second device 122 may be in proximity to the first device 102 within the vehicle 172 and operated by a passenger. The passenger may access the navigation application 128 in an attempt to join a shared navigation session with the driver (e.g., the user of the first device 102). The second device 122 may detect the presence of the first device 102 in proximity to the second device 122, and that the first device 102 is also running the navigation application 128 (e.g., implementing a navigation session). The second device 122 may request access to the navigation session being run by the first device 102, and if the first device 102 is running a navigation session, the first device 102 may provide access to the second device 122 for the second device 122 to join the navigation session. The first device 102 may, for example, transmit an access signal to the second device 122 via the communication link 140. Once the second device 122 receives the access signal, the user (e.g., the passenger) may interact with the second device 122 to accept the access to the navigation session. The first device 102 and the second device 122 may thereafter participate in a shared navigation session, wherein the navigation instructions transmitted to and displayed on the first device 102 may also be transmitted to and displayed on the second device 122. For example, the navigation application 108, 128 may provide identical shared instructions as graphical renderings 206 on the displays of both the first device 102 and the second device 122.

Additionally or alternatively, the first device 102 may detect whether another device in proximity to the first device 102 is implementing a navigation session. In some scenarios, the first device 102 may only attempt to discover other navigation sessions if an interoperability feature of the first navigation application 108 is triggered. The first navigation application 108 may trigger the interoperability feature if the first navigation application 108 detects that the first device 102 is within a car or other vehicle that holds a small number of passengers (e.g., approximately one to five passengers). If the first navigation application 108 detects that the first device 102 is within a larger vehicle, such as a bus transporting commuters or other public transportation vehicle, then the first navigation application 108 may not trigger the interoperability feature. Additionally or alternatively, the interoperability feature may be manually triggered by the user, or may be triggered as a default option. To determine the type of vehicle, the first device 102 may, for example, query a vehicle head unit, receive a broadcast from a vehicle head unit, or determine whether the route is a public transport route. In still further examples, the first navigation application 108 may trigger the interoperability feature if the first navigation application 108 detects that the first device 102 is within a vehicle that includes a navigation unit, or detects that the first device 102 is in proximity to a WiFi hotspot. Still further, the first navigation application 108 may trigger the interoperability feature based on the route or on the current GPS location of the first device 102.

The first device 102 and/or the second device 122 may detect whether another device in proximity to the first device and/or the second device is implementing a navigation session in a variety of ways. In some implementations, such as the implementation depicted in FIG. 2, the second device 122 can detect that the first device 102 is implementing a navigation session by receiving an indication in a broadcast, over the communication link 140, from the first device 122. For example, the first device 102 may broadcast that the first device 102 is currently implementing a navigation session. The second device 122 may similarly broadcast to the first device 102 that the second device 122 is implementing a navigation session, such that each device may be capable of discovering the other over the communication link 140.

As a more particular example, the first device 102 can broadcast a discoverable message in accordance with a protocol such as Bluetooth™. The first device 102 may encode the message with an identity of the first device 102 and the message may include an indication that the first device is implementing a navigation session. The second device 122 can monitor for discoverable devices on frequencies associated with the protocol. After detecting the first device 102, the second device 122 may provide an identity of the second device 122 to the first device 102 and attempt to pair with the first device 102. To complete the pairing, the first device 102 and the second device 122 may exchange security keys.

In addition to detecting that the first device 102 is implementing the navigation session, the second device 122 may detect that the first device 102 is implementing the navigation session for providing a set of navigation instructions to the same destination as the navigation session implemented by the second device 122. For example, the first device 102 may broadcast via the communication link 140 that the first device 102 is currently implementing a navigation session, and that the destination is a particular location. As another example, after discovering each other via the communication link 140, the first device 102 and/or the second device 122 may send an indication of the destination of the respective navigation session to the other device (e.g., in response to a request from the other device or automatically upon discovering the other device).

After detecting the first device 102 and determining that the first device 102 is implementing a navigation session, the second device 122 may attempt to interoperate with the first device 102 to implement a shared navigation session for providing shared navigation instructions to the user(s). The method in which the first device 102 and the second device 122 coordinate may vary depending on the capabilities of the second device 122. In some scenarios, the first device 102 (or, vice versa, the second device 122) may send a request to the other device (i.e., the second device 122) via the first communication link 140 to request to interoperate. If the second device 122 responds affirmatively, then the first device 102 and/or the second device 122 may adjust the navigation session of the second device 122 by converting the navigation session of the second device 122 to a shared navigation session that may include an identical navigation route and similar navigation instructions to the navigation session implemented on the first device 102. Of course, if the second device 122 denies the request or does not acknowledge the request (e.g., because the second device 122 does not include the shared navigation module 120), then the first device 102 may continue providing navigation instructions in accordance with the navigation session.

Moreover, the shared navigation session may include different navigation instructions between the two devices 102, 122, as illustrated in FIGS. 3-6. For example, once the shared navigation session is implemented between the two devices 102, 122, the first device 102 may communicate with a navigation server (e.g., navigation server 150) to obtain a first set of navigation instructions and a second set of navigation instructions. The first device 102 may include in the communication with the navigation server that both the first device 102 and the second device 122 are participating in the shared navigation session, and the first device 102 may additionally indicate that the devices 102, 122 are respectively associated with the vehicle driver or a vehicle passenger. In this manner, the navigation server may perform one or more techniques, described further herein, to generate the first and second sets of navigation instructions, wherein the second set of navigation instructions includes at least one difference from the first set of navigation instructions (e.g., a different instruction, an augmenting instruction, an instruction that is output in a different manner than each of the instructions in the other respective set of navigation instructions, etc.). It is to be understood, and as further described herein, that the navigation server (e.g., navigation server 150), the first device 102, and/or the second device 122 may generate the first and second sets of navigation instructions.

The first and second sets of navigation directions may be generated in a variety of ways. Generally speaking, the first device 102, the second device 122, and/or the navigation server 150 may determine the first and second sets of navigation directions that will optimize the route for the user. The first device 102, the second device 122, and/or the navigation server 150 can include user-selectable options for selecting user preferences (e.g., avoid freeways, avoid narrow roads, avoid tolls, etc.) regarding determining the optimal navigation route. Each of these user preferences and user-selectable options may be stored at the first device 102, the second device 122, and/or the navigation server 150. Of course, route optimization may include any number of user preferences, contextual indications, and/or any other suitable metrics. For example, if a user intends to travel from point A to point B, a first route from point A to point B includes a toll road and several private roads, a second route includes only public roads, and the user has expressed a preference (e.g., via the navigation application 108, 128) to avoid non-public roads, the route is optimized by generating the second route and corresponding navigation instructions for display to the user. Further, the first device 102 can select a particular navigation route depending on which available route has an earlier estimated time of arrival, has fewer maneuvers, has a shorter distance, requires less tolls, encounters less traffic, passes more points of interest, etc.

Once the route is optimized, the first device 102, the second device 122, and/or the navigation server 150 may further determine details of navigation instructions for inclusion in the first set of navigation instructions and the second set of navigation instructions. Namely, the first device 102, the second device 122, and/or the navigation server 150 may include instructions indicating that, when a passenger device joins a navigation session implemented on a driver device, the first device 102, the second device 122, and/or the navigation server 150 may analyze each navigation instruction to determine whether or not a modification to either or both of the driver navigation instructions (e.g., the first set of navigation instructions) and/or the passenger navigation instructions (e.g., the second set of navigation instructions) should be made. When a passenger device joins a navigation session implemented on a driver device, the first device 102, the second device 122, and/or the navigation server 150 may include additional detail in the passenger navigation instructions to facilitate the passenger assisting the driver when navigating the navigation route.

For example, a driver navigation instruction may read "Turn left in 100 meters," and may be audibly communicated through a speaker of the driver device (e.g., first device 102). The corresponding passenger navigation instruction may read "Turn left in 100 meters at the intersection with a large tree across from a drug store," and may be visibly output to the passenger on an interface of the passenger device (e.g., the second device 122). In this manner, the driver may receive a sufficient amount of information related to the navigation route in order to successfully follow the navigation route without being unduly distracted by the navigation instructions. If the driver is confused or otherwise is unable to adequately interpret the driver navigation instructions, the passenger may be able to aid the driver in locating the proper turning location using the additional information provided to the passenger as part of the passenger navigation instructions. Moreover, because the passenger navigation instructions were not audibly communicated over a speaker of the passenger device (e.g., the second device 122), the driver may avoid unnecessary distractions, and the passenger may choose to share the additional information only in the event the driver requests assistance or is otherwise unable to execute the provided driver navigation instructions.

Further, some scenarios may not require an explicit request to interoperate. If the navigation applications 108, 128 both include the shared navigation module 120, then the navigation applications 120, 128 may automatically enter a parallel navigation mode to provide shared navigation instructions in response to determining that the first device 102 and/or the second device 122 are implementing navigation sessions. The navigation applications 108, 128 may prompt their respective users for confirmation, or to otherwise indicate that the navigation applications 108, 128 have entered a parallel navigation mode. The first device 102 and second device 122 may then proceed as described with respect to FIGS. 3-6.

Turning to FIGS. 3-6, these figures illustrate example navigation displays while the first device 102 and the second device 122 are interoperating to provide a shared navigation session to the user(s). More particularly, the navigation applications 108, 128 may be operating in a parallel navigation mode (e.g., a shared navigation session). In the interoperating scenarios of FIGS. 3-6, the second device 122 obtains access to the navigation session of the first device 102, creating a shared navigation session in which the second device 122 receives synchronized route data corresponding to the navigation session implemented on the first device 102. During the shared navigation session, any of the navigation server 150, the first device 102, and/or the second device 122 may generate a first and second set of navigation instructions to be output at the devices 102, 122, respectively. Generally, the first and second sets of navigation instructions may each include a shared set of navigation instructions (also referred to herein as "shared navigation instructions"), and any of the navigation server 150, the first device 102, and/or the second device 122 may determine a manner in which to provide the respective sets of navigation instructions to the user(s).

Figure 3:
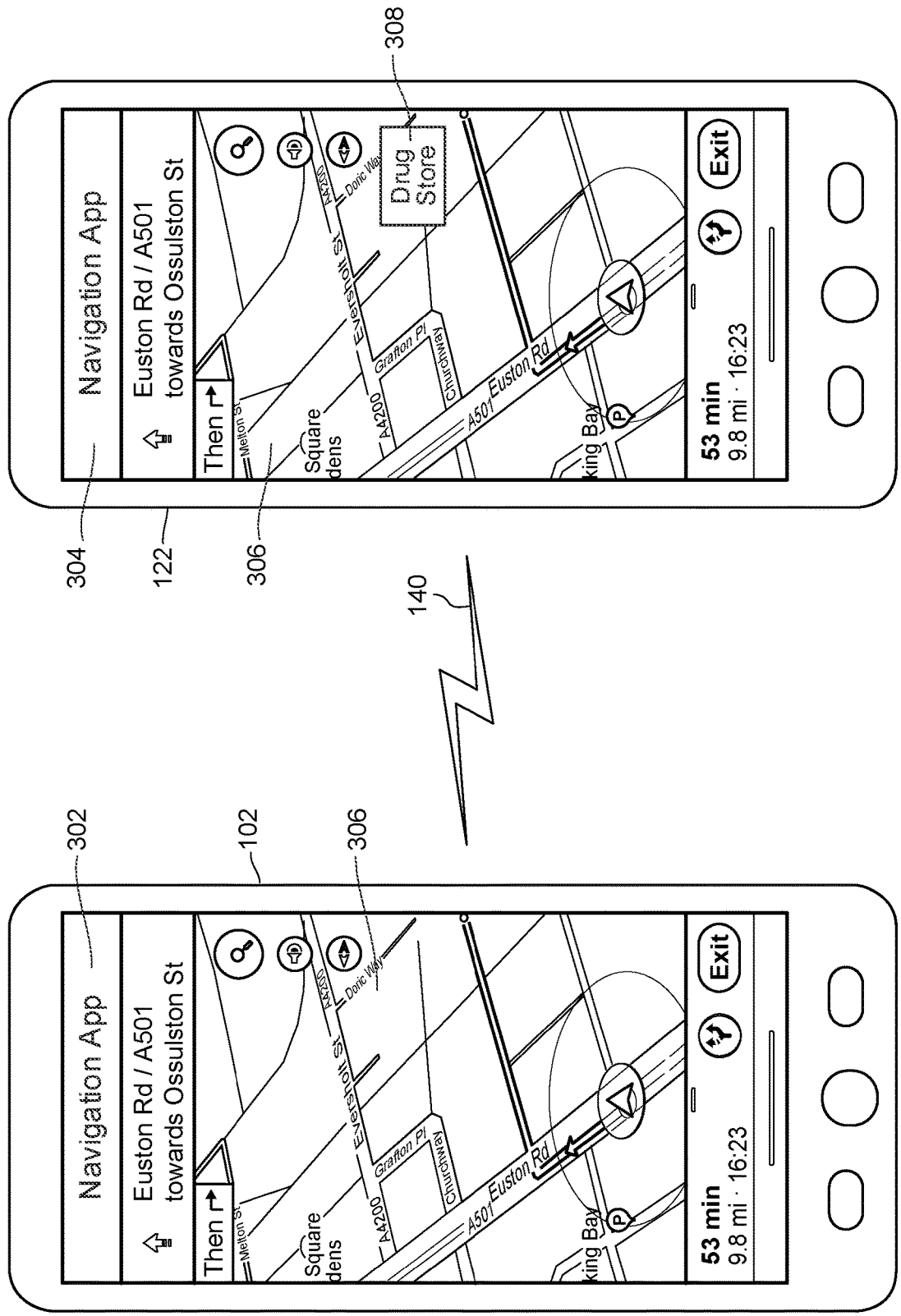

Referring to FIG. 3, initially, the first device 102 and the second device 122 may display GUIs 302 and 304, respectively, which may be similar to the GUIs 202 and 204. The GUIs 302 and 304 may include graphical renderings 306, similar to the graphical renderings 206, illustrating the current navigation route and any other synchronized route data available to the first and/or second devices 102, 122. However, before or during the shared navigation session, the navigation server, first device 102, and/or the second device 122 may generate a navigation instruction to be included in the second set of navigation instructions that is configured to augment the GUI 304. More specifically, the navigation instruction included in the second set of navigation instructions may augment the GUI 304 by displaying a point of interest (POI) 308 that is not displayed on the GUI 302.

To illustrate, the first and/or second device 102, 122 may communicate with the navigation server to commence the shared navigation session. During this communication, the first and/or second device 102, 122 may indicate the respective roles of the user(s) within the vehicle (e.g., the user of the first device 102 is the driver, and the user of the second device 122 is a passenger). Utilizing this information, the navigation server 150, the first device 102, and/or the second device 122 may designate shared navigation data/instructions for display to the driver (e.g., in this example, via the first device 102) as part of the first set of navigation instructions, and may designate the same shared navigation data/instructions along with additional navigation data/instructions for display to the passenger (e.g., in this example, via the second device 122) as part of the second set of navigation instructions. The shared navigation data/instructions may include current route data, proximate street names, estimated time of arrival, and/or any other data/instructions. In the example illustrated in FIG. 3, the additional navigation data/instructions for display to the passenger includes the point of interest 308, which is a drug store identified as a potential stop-off point along the route. In this manner, the passenger may receive the additional navigation data/instructions without distracting the driver.

Accordingly, the navigation server 150, the first device 102, and/or the second device 122 (e.g., via navigation applications 108, 128) may include selection criteria for determining the navigation data/instructions to be included in the shared navigation instructions and the navigation data/instructions to be included in the second set of navigation instructions as an additional navigation data/instruction. The selection criteria may include factors such as user preferences (e.g., as stored in the navigation applications 108, 128), contextual indicators (e.g., internal/exterior vehicle noise levels detected through device microphone, telematics data, etc.), communication link 140 specifications (e.g., bandwidth, throughput, latency, predicted link bandwidth along the first or second routes, capabilities of the first and second devices, hardware such as antennas of the first and second devices, etc.), and/or any other suitable criteria. Hence, these determinations can result in optimized navigation data/instruction delivery to multiple users while simultaneously reducing connectivity bandwidth, increasing connectivity speed, and improving device interoperability.

Moreover, as previously mentioned, the navigation server 150, the first device 102, and the second device 122 can collectively determine how to allocate and distribute the processing functions required to generate the shared navigation instructions and the at least one additional navigation instruction included in the second set of navigation instructions. For example, the first device 102 alone may generate the shared navigation instructions and the additional navigation instruction, and then transmit the shared navigation instructions along with the additional navigation instruction (e.g., collectively, the second set of navigation instructions) to the second device 122. As another example, the first device 102 and the second device 122 may each generate instructions for a portion of the navigation route, and as a result, may optimize the processing resources of each device 102, 122, thereby providing at least improved power consumption and faster processing speed.

As yet another example, the first device 102 and the second device 122 may select one of the devices 102, 122 to be a primary device. The primary device may establish a connection with the navigation server 150, may coordinate generation of the first and second sets of navigation instructions, and may determine the manner in which the first and the second devices 102, 122 can provide the first and second sets of navigation instructions to the user(s), respectively. In some scenarios, the primary device may receive synchronized route data from the navigation server 150 (e.g., updated traffic information, alternative route data, point of interest data, etc.), generate the first and second sets of navigation directions, and determine a manner in which the devices 102, 122 are to deliver the first and second sets of navigation directions to the user, respectively. In other scenarios, the primary device may delegate some or all of these functions to the other device and/or to the navigation server 150. In this manner, the devices 102, 122 may each receive respective sets of navigation instructions without establishing multiple connections to the navigation server 150, resulting in decreased network traffic and correspondingly higher network speeds.

In further scenarios, the first device 102 and second device 122 may perform some or all of these functions in combination. Which device is selected as the primary device and/or which device performs each function may depend on a set of selection criteria of the shared navigation module 120. The selection criteria may be based on factors such as the relative battery state, charging state, location (e.g., in the case of a vehicle environment, which device is closer to a driver of the vehicle), bandwidth, signal strength, processing capability, display capability, speaker quality, etc. of the two devices 102, 122. For example, the first and second devices 102, 122 may designate the first device 102 as the primary device because the first device 102 has a stronger connection to the network 144 and/or a connection with higher bandwidth and/or unmetered access to the network 144. As the primary device, the first device 102 may delegate particular tasks to the second device 122 based on the capabilities of the second device 122. For instance, if the second device 122 has higher quality speakers, or is configured to emit audio via the vehicle speakers 184, then the primary device may designate the second device 122 as the device to emit audio instructions corresponding to the shared navigation instructions.

For ease of explanation only, the discussion of FIG. 3 refers to the first device 102 as the primary device that coordinates generating and outputting the shared navigation instructions. While the discussion of FIG. 3 refers to the first device 102 as performing certain tasks, such as selecting a particular navigation instruction as the primary device, the first device 102 can delegate the tasks to the second device 122, or can collaborate with the second device 122 to perform the tasks. Moreover, it is to be understood that the first device 102 and the second device 122, as referenced herein, may display/communicate navigation instructions to a driver or a passenger(s), that any number of devices may participate in the shared navigation session (e.g., devices of multiple passengers in addition to the driver's device), and that a driver's device is not necessary to implement the functionality described herein. For example, a passenger's device may implement a navigation session, and the passenger may designate their device as a "driver device" for the purposes of the shared navigation session.

As the primary device, the first device 102 may determine a manner in which to provide the first and second sets of navigation instructions to the user. The manner in which the first and second sets of navigation instructions are to be provided includes how the first and second sets of navigation instructions will be displayed to the user and how any accompanying audio instructions will be delivered to the user (e.g., by which device). Which device presents the instructions can depend on the capabilities of the devices, and on the instructions themselves. For example, if the first set of navigation instructions include imminent driving actions (e.g., upcoming turns, exits, etc.), then the first device 102 may display the first set of navigation instructions and emit the corresponding audio instructions for interpretation by the driver. By contrast, if the second set of navigation instructions include additional instructions, information, display configurations, and/or otherwise differ from the corresponding first set of navigation instructions, the first device 102 may instruct the second device 122 to display the second set of navigate instructions to a passenger without emitting audio instructions. In still further cases, the primary device may display the shared navigation directions and emit turn-by-turn navigation directions, and the other device can emit other route information, such as traffic or POI information. By selecting a coherent manner in which to present the instructions, the first and second devices 102, 122 can avoid unnecessary distractions to a driver by talking over or interrupting each other.

Furthermore, while the shared navigation session is in progress, the first device 102 and/or second device 122 may continue to collect information from the navigation server 150 and/or other sources via the network 144 to update the route. The primary device can exclusively collect new information, or can delegate the download task to the other device. For example, if the primary device has a better connection to the network 144, has a better battery life, or has a lower cost data plan than the other device, then the primary device can exclusively collect new information. By only one device collecting new information there is a reduction in bandwidth and processing requirements across the first and second devices. As another example, the first device 102 may collect map data from the navigation server 150, and the second device 122 may collect traffic data from the navigation server 150. Thus, the devices 102, 122 can distribute the downloading tasks in a way that maximizes the speed of downloads and/or the efficiency of the devices 102, 122.

Figure 5:
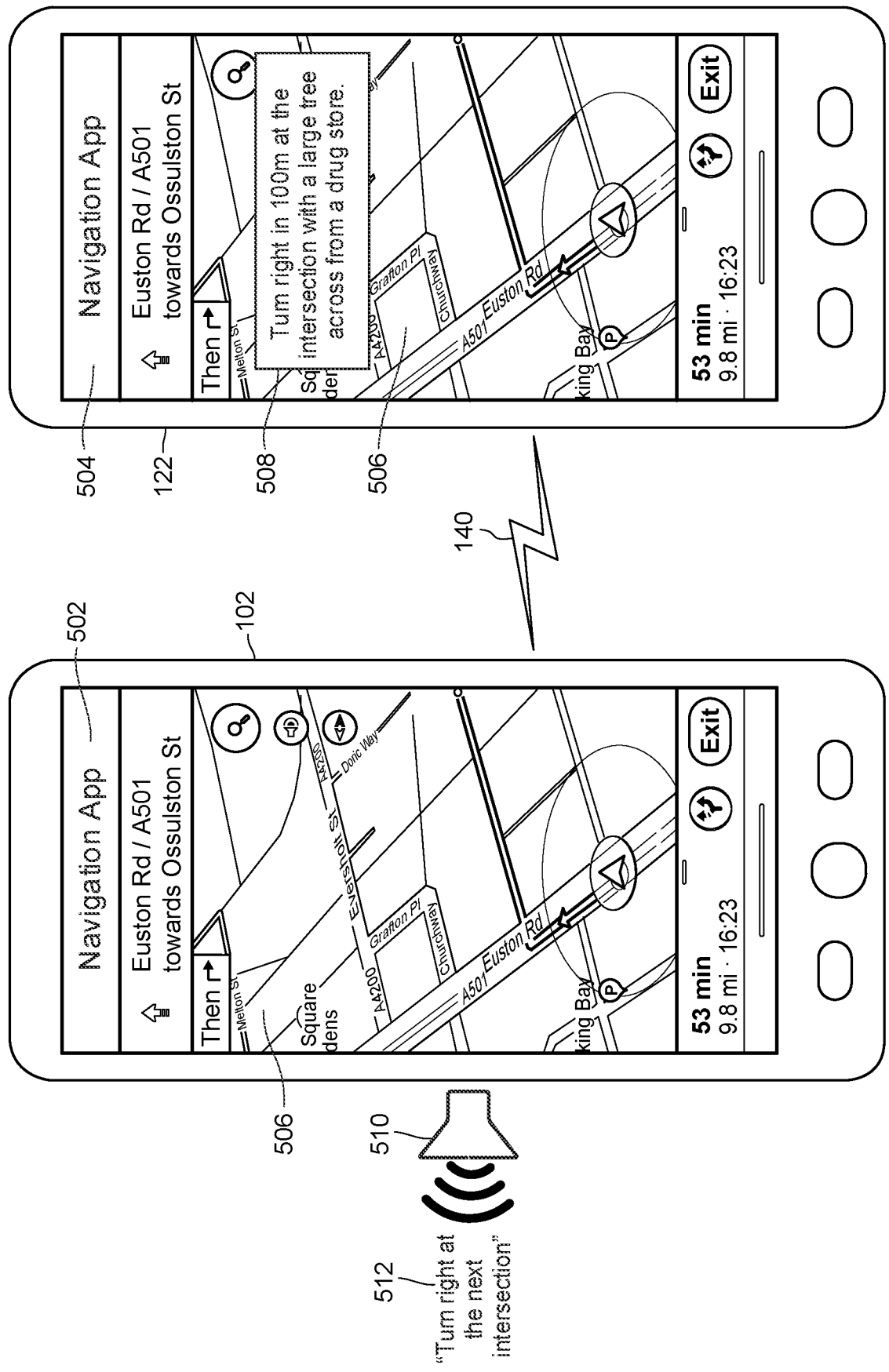
Figure 6:
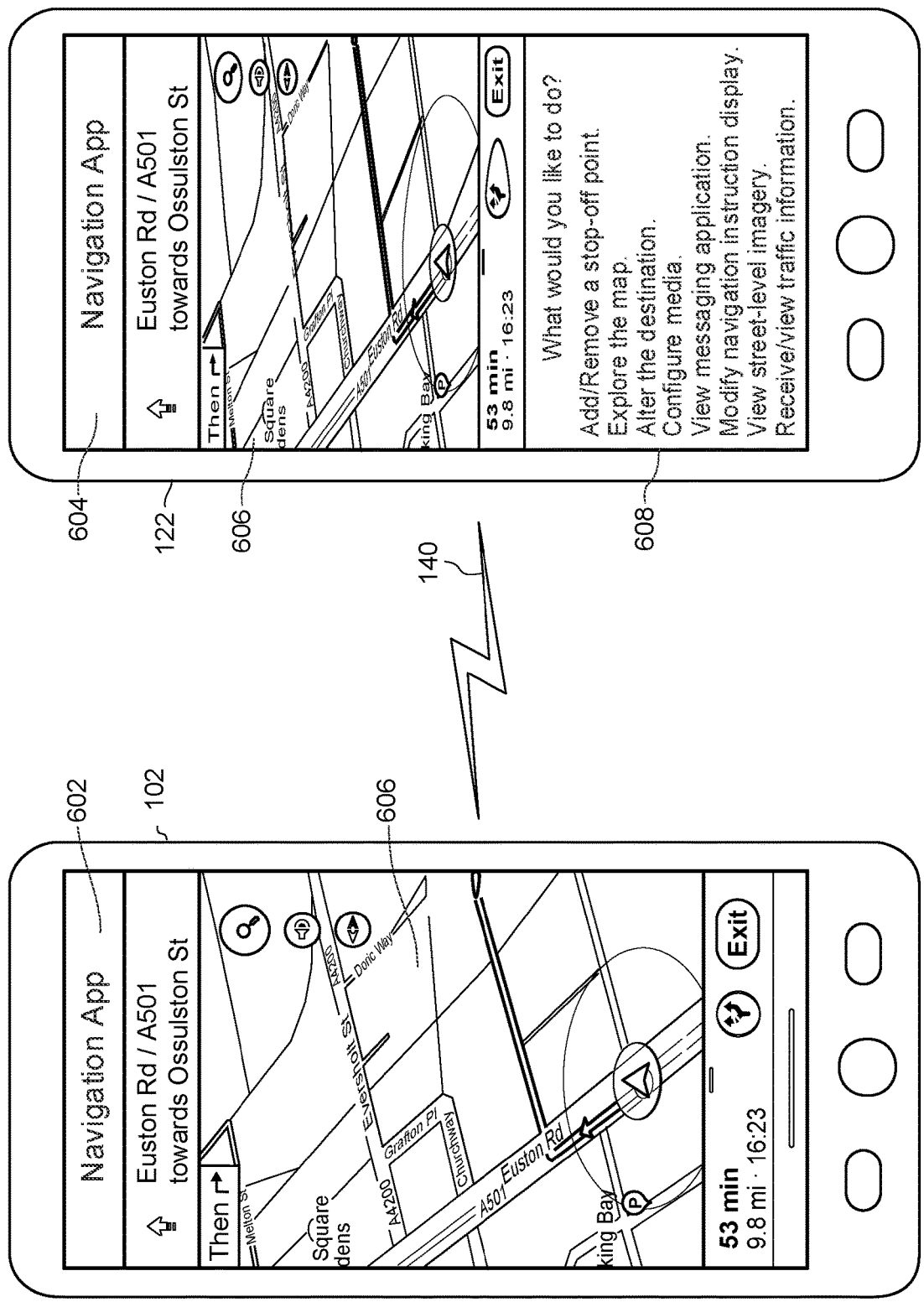

In addition to indicating a POI on the graphical rendering 306, the techniques of the present disclosure may enable the second device 122 to display additional information associated with the navigation route and allow a user to modify/augment the presentation of that information. For example, in FIG. 4, the second device 122 displays additional information related to a POI for a user. FIG. 5 illustrates the first device 102 audibly communicating succinct navigation instructions to a driver while the second device 122 visibly communicates detailed navigation instructions to a passenger. FIG. 6 illustrates the second device 122 outputting options for a user to augment or otherwise modify the presentation of information as part of the graphical rendering. Thus, each figure represents additional functionalities available to passengers or other users participating in shared navigation sessions utilizing embodiments of the present disclosure.

Figure 4:
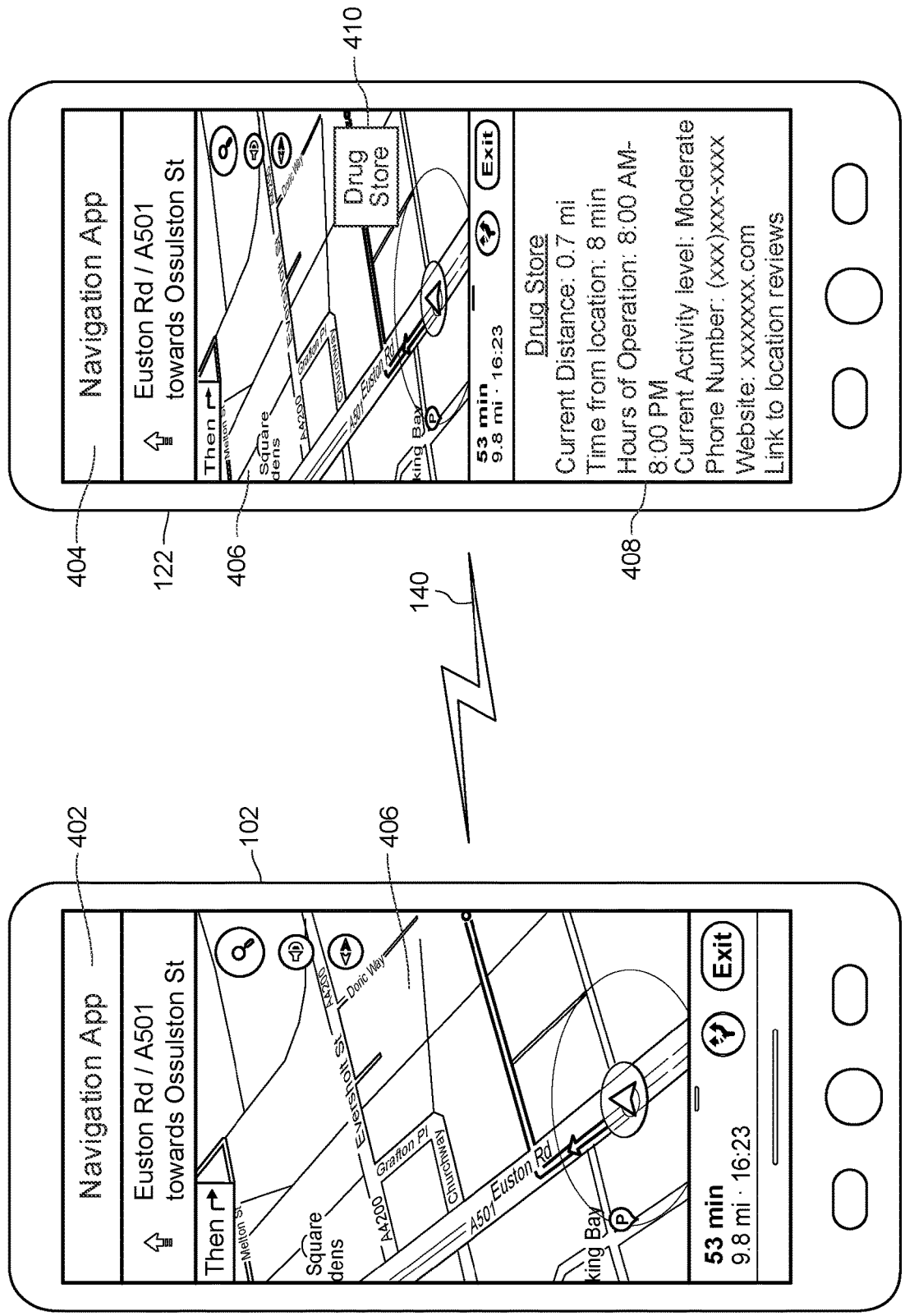

Accordingly, FIG. 4 illustrates example GUIs 402 and 404 of the navigation applications 108, 128 in an example scenario where the first device 102 and the second device 122 are interoperating to provide a shared navigation session. In the example scenario, both the first device 102 and the second device 122 display turn-by-turn navigation instructions of the shared navigation instructions, as illustrated in the graphical rendering 406. However, the second device 122 also displays a point of interest 408 and an additional information section 410 displaying relevant information about the point of interest 408. As an example, the first device 102 may display the illustrated turn-by-turn directions and may further audibly communicate the turn-by-turn directions to the driver. Simultaneously, the second device 122 may display the point of interest 408 to a passenger, and if the passenger interacts with the point of interest 408 indication, the second device 122 may further display the additional information section 410 to provide the passenger with information about the point of interest 408. The second device 122 may avoid communicating any of the point of interest 408 information audibly to minimize driver distraction/confusion. Thus, the passenger may identify the point of interest 408 and determine whether or not the point of interest 408 may be a suitable stop-off point for the vehicle occupants while they travel along the navigation route.

Generally, the point of interest 408 may be a landmark, a business, an alternate route suggestion, a street, a road, a highway, a town, a public transportation hub, a body of water, a shopping center, a department store, a neighborhood, a building, a home, a restaurant, and/or any other suitable location or some combination thereof. The point of interest 408 may also change depending on the magnification of the digital map on the user display (e.g., a point of interest may change from a city to a state if the user sufficiently decreases the magnification of the digital map). The point of interest 408 may be proximate to the navigation route, and may be identified and output to a user (e.g., a passenger) as a result of a user-specified user preference (e.g., preferred restaurants, gas stations, drug stores, etc.), a determined vehicle maintenance requirement (e.g., low fuel gauge, low tire pressure warning, check engine light tripped, etc.), a determined passenger preference (e.g., time between stops indicates it may be time for a restroom break, meal, or sleep), and/or any other suitable determination criteria. For example, the point of interest 408 may be a drug store, and may be identified along the navigation route by the first device 102 as a result of a user-specified preference for the drug store, communicated to the second device 122 as part of the second set of navigation instructions, and output to the passenger. The passenger may interact with the second device 122 to select the point of interest 408, and the second device 122 may augment the graphical rendering 406 to include the additional information section 410 on the display of the second device 122.

The additional information section 410 may generally include any relevant information corresponding to the point of interest 408. In the example scenario of FIG. 4, the additional information section 410 includes a current distance to the drug store, a time to reach the drug store along the current route, the hours of operation of the drug store, a current activity level of the drug store, a phone number associated with the drug store, a website associated with the drug store, and a web-enabled link to reviews about the drug store. Of course, the information included in the additional information section 410 may vary depending on the point of interest 408 selected by the user (e.g., a passenger), and may include any suitable information and/or links to other applications, websites, etc. that are related to the point of interest 408.

In addition to providing a passenger or other user (e.g., of the second device 122) information about POIs along the navigation route, embodiments of the present disclosure can optimally deliver navigation instructions to the various participants of the shared navigation session. For example, a driver may optimally receive navigation instructions through short, verbal communications that avoid forcing the driver to divert their attention from the roadway and surrounding vehicle environment. A passenger may not have to constantly observe the roadway and surrounding vehicle environment, so they generally have the capacity to read and interpret detailed navigation instructions. Consequently, embodiments of the present disclosure may facilitate this optimal delivery of navigation instructions by determining and generating appropriate navigation instructions for each member of the shared navigation session.

For example, as illustrated in FIG. 5, the first device 102 may utilize the navigation app 502 to display navigation instructions as a graphical rendering 506 and by emitting corresponding audio instructions. As displayed in the graphical rendering 506, the first device 102 may emit audio instructions corresponding to the upcoming right turn that is part of the navigation route. The first device 102 may utilize an integrated speaker 510 or an externally coupled (e.g., via wireless or wired connection) speaker to audibly convey the directions that are visibly displayed in the graphical rendering 506. For example, the first device 102 may generate an audible instruction 512 to "Turn right at the next intersection," so that the driver may hear the directions without diverting their attention from the surrounding vehicle environment.

By contrast, the second device 122 may utilize the navigation app 504 to display the navigation instructions as the graphical rendering 506, but does not emit the corresponding audio instructions. Instead, the navigation application 504 may display a prompt 508 overlaying or integrated with the graphical rendering 506 to indicate instructions representative of the displayed directions in the graphical rendering 506. The graphical rendering 506 displays a right turn ahead of the current position of the vehicle, so the prompt 508 may visually indicate to a user (e.g., a passenger) that the vehicle is approaching the turn along the navigation route by displaying the text "Turn right in 100 m at the intersection with a large tree across from a drug store." As another example, the prompt 508 may indicate to a passenger that the vehicle is approaching the turn by displaying the text "Turn right in 100 meters at Main Street," while the analogous instruction from the first set of navigation instructions displayed to the driver indicates (e.g., audibly communicates) that the driver should "Turn right in 100 meters." In this manner, the passenger may look ahead of the vehicle in an attempt to identify a large tree, a drug store, and/or a street sign to help the driver identify the location of the right turn.

In the scenario illustrated in FIG. 5, the first device 102 and second device 122 may receive the first and second sets of navigation instructions from a navigation server (e.g., navigation server 150), or one or both devices 102, 122 may generate the first and second sets of navigation instructions. To illustrate, in the above examples, the first set of navigation instructions may include the graphical rendering 506 and the audible instruction 512, while the second set of navigation instructions may include the graphical rendering 506 and the prompt 508. The navigation server may, for example, generate the first and second sets of navigation instructions by determining that the navigation directions should be audibly communicated to the driver and visibly communicated to the passenger. Further, when generating the navigation instructions for the driver, the navigation server may store instructions (e.g., as part of the server shared navigation module 154) to automatically generate short, simple audible instructions as part of the first set of navigation instructions to minimize driver distraction. Similarly, the navigation server may store instructions to automatically generate longer, detailed written instructions as part of the second set of navigation instructions for display to the passenger who may then choose to convey the details of the written instructions to the driver as necessary. Of course, each of the first device 102, the second device 122, and/or the navigation server 150 may generate the first and second sets of navigation instructions. Moreover, and as discussed further herein, the generation of the first and second sets of navigation instructions may be performed in whole or in part by a machine learning-based model configured to segment, summarize, and/or otherwise analyze the set of navigation instructions.

As another example, the first device 102 may receive a set of navigation instructions from the navigation server. The first device 102 may analyze the set of navigation instructions to determine which instruction(s) should be shared between both the first and second sets of navigation instructions, and which instructions should be included exclusively in the first or the second set of navigation instructions. In the above example of FIG. 5, the first device 102 may maintain a network connection (e.g., via network 144) with the navigation server 150, and may receive a set of navigation instructions indicating the upcoming right turn. The navigation server 150 may additionally include the audible instruction 512, the text to be displayed in the prompt 508, and the data necessary to display the graphical rendering 506 in the set of navigation instructions if, for example, the navigation server 150 receives an indication from the first device 102 that another device (e.g., the second device 122) has joined the navigation session.

Continuing this example, the first device 102 may store instructions (e.g., as part of the shared navigation module 120) to automatically sort the received instructions according to pre-established criteria related to the devices 102, 122. These pre-established criteria may include, for example, device identifiers indicating whether the respective device is displaying/communicating navigation instructions for the driver or a passenger, ambient conditions within the vehicle (e.g., noise levels as detected from an integrated or connected microphone), and/or any other suitable criteria or combinations thereof. For example, the first device 102 may analyze device identifiers for each of the devices 102, 122 to determine that the first device 102 is displaying navigation instructions for a driver and the second device 122 is displaying navigation instructions for a passenger. Accordingly, the first device 102 may sort audio instructions (e.g., the audible instruction 512) and/or other concise navigation instructions into the first set of navigation instructions to be displayed/communicated by the first device 102 to the driver, and the first device 102 may sort more detailed textual navigation instructions (e.g., the text included in the prompt 508) into the second set of navigation instructions to be displayed/communicated by the second device 122 to the passenger(s). The first device 102 may then display/communicate the first set of navigation instructions to the driver, and the first device 102 may transmit the second set of navigation instructions to the second device 122 via the communication link 140 for display/communication to the passenger(s).

Moreover, the device handling the sorting and distribution of the sets of navigation instructions may additionally determine that information related to the navigation route may be split between the first device 102 and the second device 122. For example, the navigation server may transmit a set of navigation instructions to the first device 102, and the set of navigation instructions may include traffic data corresponding to the navigation route in addition to the navigation instructions (e.g., turn-by-turn directions). The first device 102 may sort the traffic data corresponding to the navigation route into the second set of navigation instructions for display on the second device 122 as part of the prompt 508. In this manner, the set of navigation instructions may be ideally distributed between or among the devices (e.g., 102, 122) for display to their respective users such that the navigation instructions are minimally distracting to the driver while still providing vehicle occupants the necessary information to make critical decisions about their navigation route.

For example, if the traffic data includes a warning that a vehicle accident is causing a two-hour slowdown on a portion of the current navigation route ten miles ahead, the vehicle occupants may desire to change the current navigation route to one that avoids the portion of the route where the vehicle accident occurred. Accordingly, a passenger who receives this traffic data may interact with their respective device to plan an alternate route that avoids the portion of the current route where the vehicle accident occurred. The passenger may, for example, zoom out of the graphical rendering 506 to view a larger portion of the current navigation route, including the portion where the vehicle accident occurred. The passenger may then explore alternative route options by clicking and dragging the current navigation route along the device interface (e.g., a touchscreen), audibly communicating with the device to obtain an alternate route, manually querying the navigation app 502, 504 to generate alternate route suggestions, and/or by any other suitable means. Once an alternate route is found, the passenger may accept the alternate route, and the navigation route may be updated on the passenger and driver devices to the alternate route via the communication link 140. In some embodiments, the alternate route identified and chosen by the passenger may only be accepted as the new navigation route upon an audibly expressed acceptance from the driver (e.g., the driver saying "Yes" in response to the driver's device asking "Accept the alternate route?"). Moreover, in some embodiments, some or all of the passenger device functionality corresponding to the above example may not be available on the driver's device. To minimize distractions, the driver's device may disable zoom/panning features of the graphical rendering 506, manual alterations to the navigation route, and/or the driver's device may otherwise simply isolate such functionality to the passenger's device.

In another example, the first device 102 may receive traffic data indicating a traffic jam several miles ahead in the navigation route, and the first device 102 may automatically determine an alternate route for inspection by a passenger. If the first device 102 is operated by a driver, the first device 102 may transmit both the traffic data and the proposed alternate route to the second device 122 for display to the passenger(s). The second device 122 may display an option to the passenger to accept the alternate route, which the passenger may accept to automatically update the navigation route for both devices 102, 122. It is to be understood that the first device 102, the second device 122, and/or the navigation server 150 may automatically determine an alternate route based upon traffic data, transmit the traffic data and the proposed alternate route for display to a passenger, and/or automatically update the navigation route for all devices participating in the shared navigation session.

As previously mentioned, in addition to providing navigation instructions to multiple devices as part of a shared navigation session, the techniques of the present disclosure may allow user(s) (e.g., passengers) to modify the presentation, details, and/or functionality of the navigation instructions. For example, in FIG. 6, the first device 102 may visibly display the first set of navigation instructions by the navigation app 602 generating the graphical rendering 606. The second device 122 may similarly utilize the navigation app 604 to generate the graphical rendering 606 as part of the second set of navigation instructions, but the second device 122 may further display a set of interactive options 608 configured to allow a user to modify the presentation, details, and/or functionality of the displayed navigation instructions.

Generally, each option output as part of the set of interactive options 608 may be functions available to a user at any time during a navigation session (e.g., exploring the map, adding/removing stop-off points, etc.) and/or may be specific functions related to the second set of navigation instructions currently output by the second device 122. As an example, the set of navigation instructions at a particular time may indicate an upcoming right turn followed by a period of travel along a new roadway. The first device 102 may receive the set of navigation instructions and sort the navigation instructions into the first and second sets of navigation instructions, for presentation at the first and second devices 102, 122, respectively. Both sets of navigation instructions may include the indication of the upcoming right turn and the period of travel along the new roadway, but the second set of interactive options 608 may additionally include an interactive option to modify the graphical rendering 606 by adding a stop-off point identified as adjacent to the new roadway.

Consequently, the navigation server (e.g., navigation server 150) may include supplemental data as part of the set of navigation instructions that the first device 102 and/or the second device 122 may utilize to determine the set of interactive options 608. The supplemental data may include, for example, POIs near the current navigation route (e.g., within 2-3 blocks, 500 feet, etc.), traffic data that may impact the current navigation route (e.g., traffic incidents along and/or proximate to the current navigation route), weather data related to weather event currently impacting and/or projected to impact the current navigation route, and/or any other suitable data or combinations thereof.

As previously mentioned, determining supplemental data provided as part of the set of navigation instructions may utilize contextual data corresponding to the vehicle and vehicle occupants. More specifically, the determination of supplemental data may be performed using a set of rules corresponding to the contextual data. The contextual data may include one or more contextual parameters that the navigation server 150, first device 102, and/or the second device 122 may use to determine the supplemental data. If the navigation server device 150 makes the determination of the supplemental data, the navigation server 150 may retrieve the contextual data from applications installed on the first and/or second devices 102, 122 (e.g., navigation application, telematics sensors, calendar application), data stored on a remote server/database (e.g., map database 155, traffic database 157, POI database 159), and/or any other suitable location. Of course, it will be appreciated that any of the first device 102, the second device 122, and/or the navigation server 150 may perform the determination of supplemental data corresponding to the second set of navigation instructions.

Generally, the contextual data may include various contextual parameters that may indicate specific data that may be useful for the vehicle occupants. For example, the navigation server 150 may retrieve contextual data including contextual parameters indicating that (1) the vehicle has a quarter tank of fuel, (2) the vehicle has traveled along roadways continuously for the past two hours, and that (3) the current navigation route leads the vehicle near a gas station within the next twenty minutes. The contextual data may also include contextual parameters indicating that (4) the weather forecast corresponding to a portion of the upcoming navigation route just beyond the gas station includes a high chance of heavy rain, and that (5) multiple vehicles currently traveling along the portion of the upcoming navigation route just beyond the gas station are reporting heavy traffic. Accordingly, the navigation server 150 may determine supplemental data including a suggested stop-off point featuring the gas station and an alternate route to avoid the inclement weather and heavy traffic.

Moreover, the navigation server 150 may apply weighting factors to the contextual parameters in order to potentially achieve a more accurate representation of the implications of the contextual parameters. Referencing the above example, the navigation server 150 may apply weighting factors to contextual parameters (1), (2), and (3), in light of contextual parameters (4) and (5), to decrease their impact on the resulting supplemental data provided to the devices 102, 122. The navigation server 150 may associate an adverse weather condition forecast along the portion of the navigation route (e.g., contextual parameter (4)) coupled with a heavy traffic indication along the same portion of the navigation route (e.g., contextual parameter (5)) with a decreased chance of continuing along the current navigation route. Further, the navigation server 150 may associate an extended period of continuous travel (e.g., contextual parameter (2)) in addition to a low fuel status (e.g., contextual parameter (1)) with an increased chance of requiring a stop-off point soon.

Consequently, the navigation server 150 may apply a weighting factor to all or some of contextual parameters (1)-(5) to decrease/increase their impact on the resulting supplemental data. The navigation server 150 may then input the weighted values into a rules-based determination algorithm and/or a machine-learning based algorithm to determine the supplemental data. Namely, the navigation server 150 may determine that the optimal suggestions to make as part of the supplemental data may be to suggest an alternate route to avoid the inclement weather and corresponding heavy traffic, and to further suggest a rest stop/gas station along the alternate route to alleviate the vehicle occupant concerns regarding the low fuel and any other accompanying concerns (e.g., bathroom break, hungry passengers, etc.). Thus, the navigation server 150 may transmit the supplemental data to the first device 102 and/or the second device 122 as part of the set of navigation instructions for presentation to the user(s) of the devices 102, 122.

Additionally or alternatively, the navigation server 150 may calculate a confidence score for each contextual parameter when compared to a set of known vehicle occupant preferences, and determine the supplemental data based upon the contextual parameter(s) with the highest confidence score(s). For example, the navigation server 150 may strongly associate contextual parameters (1)-(3) with a known vehicle occupant preference to top off fuel tanks and/or otherwise drive with a particular fuel level (e.g., greater than a quarter tank), and may weakly associate contextual parameters (4) and (5) with a known vehicle occupant preference to take commonly traveled roadways, regardless of weather/traffic conditions. Consequently, the navigation server 150 may then generate a high confidence score (e.g., a 95 out of 100) for supplemental data suggesting to maintain the current navigation route and to recommend a stop-off point at the gas station, and a lower confidence score (e.g., a 30 out of 100, etc.) for supplemental data suggesting an alternate route featuring a roadway that is not commonly traveled by the vehicle occupant(s). Such scores may be predetermined, or the navigation server 150 may calculate the confidence scores based on an algorithm utilizing data association, semantic analysis, and/or any other suitable technique. Moreover, the vehicle occupant preferences may be predetermined and stored at the navigation server 150 (e.g., in memory 153), and/or at the devices 102, 122 (e.g., in memories 106, 126). However, it should be understood that the navigation server 150 may analyze the contextual parameters in accordance with any suitable algorithm or technique.

Further, the set of interactive options 608 may include any suitable options for a user to modify the shared navigation session. For example, the set of interactive options 608 may include an option for the user to "Configure media." Using this option, the user may have control over media (e.g., videos, audio recordings, etc.) displayed, played, and/or otherwise conveyed to vehicle occupants. Similarly, the set of interactive options 608 may include an option for the user to "View messaging application." Using this option, the user may have control over a messaging application of the driver and/or any other participant in the shared navigation session. These functions may be delegated to the user of the second device 122, such that the user of the second device 122 may require the permission (e.g., via physical interaction and/or verbal communication with the first device 102) of the user of the first device 102 to receive these options as part of the set of interactive options. Moreover, as previously mentioned, the user may have one or more options to modify and/or otherwise alter the navigation route. For example, the set of interactive options 608 may include an option for the user to "Alter the destination." Using this option, a user may interact with the second device 122 (e.g., clicking and dragging on the graphical rendering 606) to change the destination of the navigation route, and/or portions of the navigation route in order to reach the destination.

Example Logic for Providing a Passenger Access to a Shared Navigation Session

Figure 7:
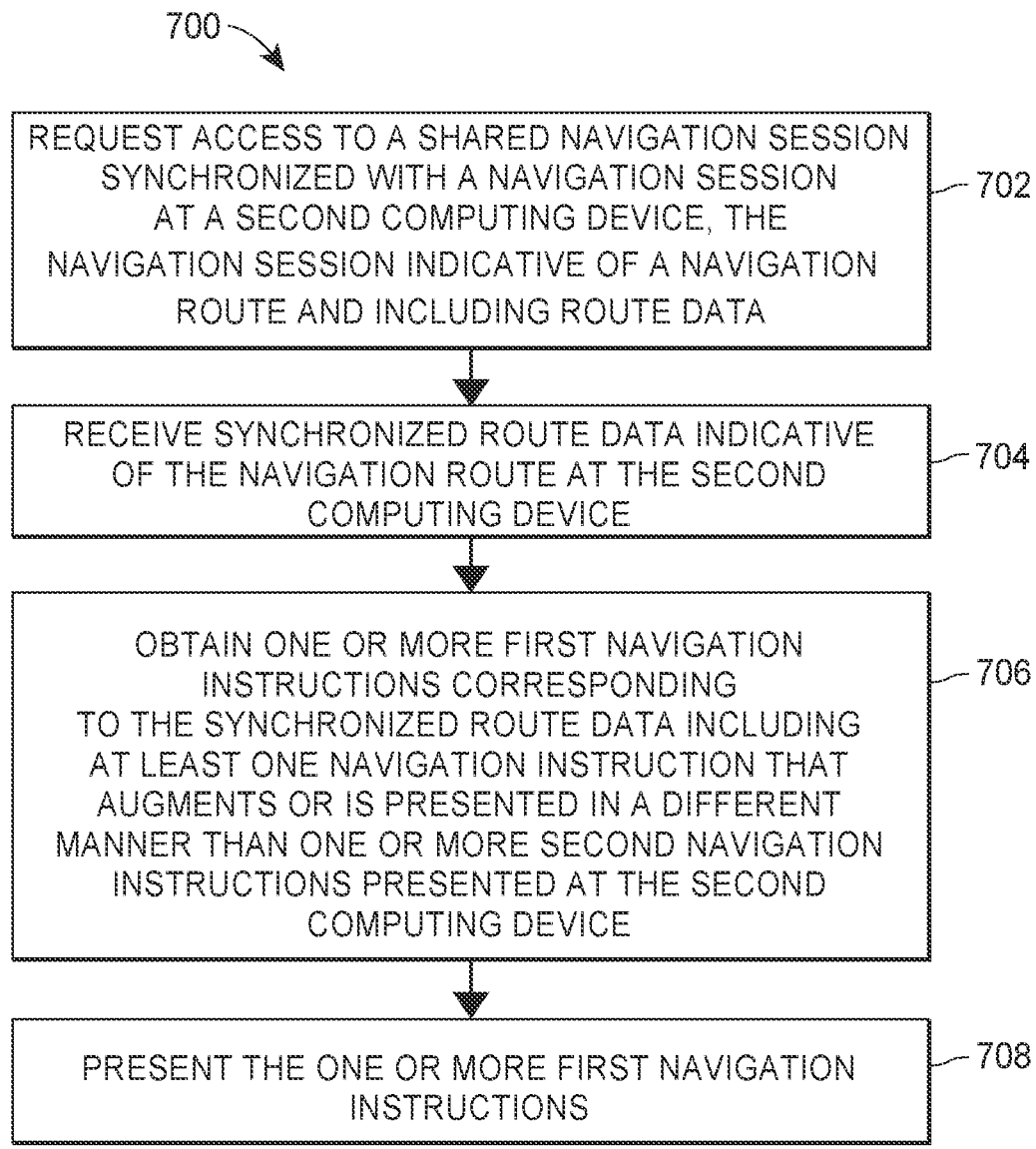
FIG. 7 is a flow diagram of an example method for sharing a navigation session to minimize driver distraction, which can be implemented in a computing device, such as the second computing device of FIGS. 1A-6.
Figure 8:
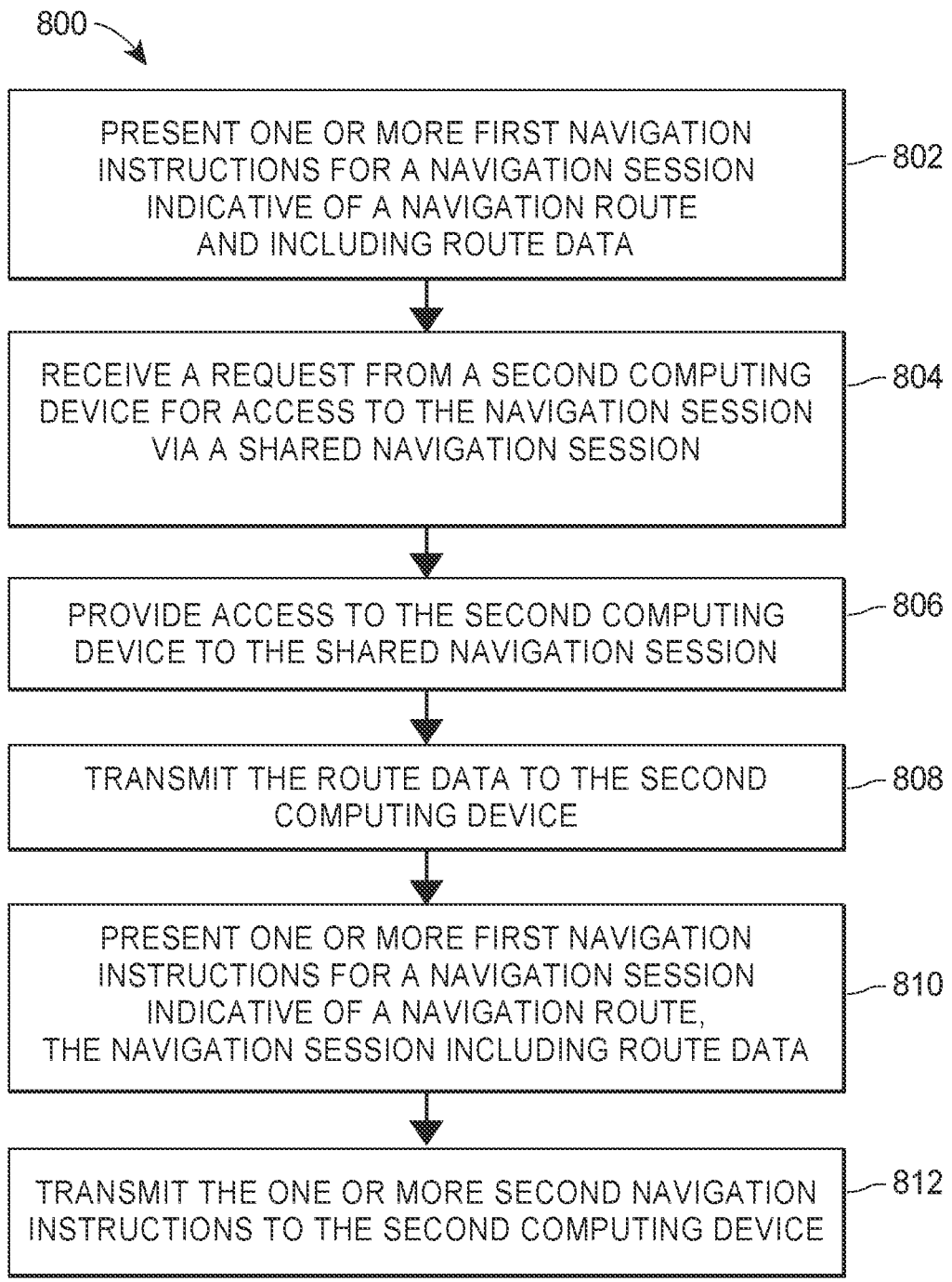
FIG. 8 is a flow diagram of an example method for sharing a navigation session to minimize driver distraction, which can be implemented in a computing device, such as the first computing device of FIGS. 1A-6.

FIGS. 7-8 are flow diagrams illustrating example methods for providing a passenger access to a shared navigation session, in accordance with the techniques of this disclosure. It is to be understood that, for ease of discussion only, the "first computing device" and "second computing device" discussed herein in reference to FIGS. 7-8 may correspond to the first device 102 and/or the second device 122.

Turning to FIG. 7, a method 700 can be implemented by a first or second computing device (e.g., the first device 102 or the second device 122). The method 700 can be implemented in a set of instructions stored on a computer-readable memory and executable at one or more processors of the first or second computing device (e.g., the processor(s) 104 or the processor(s) 124).

At block 702, the one or more processors of a first computing device (e.g., the second device 122) may request access to a shared navigation session that is synchronized with a navigation session at a second computing device (e.g., the first device 102). The navigation session may be indicative of a navigation route, and the navigation session may include route data. The route data may include, for example, distance values associated with the navigation route, time estimations associated with the navigation route, and/or any other suitable data or combinations thereof. In some embodiments, the first computing device may request access by transmitting a request transmission to the second computing device, scanning a visual code (e.g., a barcode, a QR code, etc.) output on a display of the second computing device, and/or by any other suitable means or combinations thereof.

At block 704, the first computing device may receive synchronized route data indicative of the navigation route in response to receiving access to the shared navigation session. The synchronized route data may include the route data, and may further include display instructions/configurations, navigation instructions, graphical indications, and/or any other suitable data/indications. For example, the second computing device may transmit the synchronized route data as part of the response to the request for access received from the first computing device, and the synchronized route data may include navigation instructions and graphical display elements (e.g., the graphical rendering 606) that are synchronized with the navigation instructions and graphical display elements that are output by the second computing device.

In some embodiments, the route data and the synchronized route data is generated at a navigation server (e.g., navigation server 150). The second computing device may be communicatively coupled with the navigation server, and the second computing device may relay the synchronized route data from the navigation server to the first computing device. Further in these embodiments, the first computing device may not be communicatively coupled with the navigation server. In this manner, the first and second computing devices may each receive synchronized route data without causing unnecessary network traffic and occupying limited navigation server bandwidth.

In some embodiments, receiving access to the shared navigation session includes at least one of (i) receiving, by the one or more processors of the first computing device, an invitation transmission from the second computing device, (ii) automatically pairing, by the one or more processors, with the second computing device via a short-range communication protocol, (iii) scanning a visual code displayed on the second computing device including a time limited identifier used for pairing with the second computing device, or (iv) connecting the first computing device to the second computing device with a cable configured to communicatively couple the first computing device to the second computing device.

At block 706, the one or more processors of the first computing device may obtain one or more first navigation instructions corresponding to the synchronized route data. The first computing device or second computing device may select the one or more first navigation instructions from a set of navigation instructions, and the one or more first navigation instructions may include at least one navigation instruction that augments or is output in a different manner than one or more second navigation instructions output at the second computing device. Generally, the at least one navigation instruction may include any graphical/audio display, user-selectable option, and/or any other presentation to a user of the first computing device that may not be output to a user of the second computing device. For example, the at least one navigation instruction may include any of the user options and/or graphical/audio modifications discussed with respect to the second device 122 in FIGS. 2-6 (e.g., POI 308, additional information section 410, prompt 508, set of interactive options 608), and as discussed further herein.

In some embodiments, the one or more processors of the first computing device may segment the set of navigation instructions into the one or more first navigation instructions and the one or more second navigation instructions. Further, at least one of the one or more first navigation instructions corresponds to at least one of the one or more second navigation instructions. The first computing device may also generate the at least one navigation instruction at a different level of detail than a corresponding at least one of the one or more second navigation instructions. For example, the set of navigation instructions may include a navigation instruction directing the driver to turn right onto a new roadway in fifty meters, and to continue along the new roadway for two miles. The first computing device may generate the at least one navigation instruction which states the right turn takes place at an intersection featuring "a large tree across from a drug store." The at least one navigation instruction may be displayed at the first computing device. Thus, the first computing device may display the set of navigation instructions along with the at least one navigation instruction, and the second computing device may display the set of navigation instructions without the at least one navigation instruction.

In these embodiments, the one or more processors of the first computing device may utilize a machine learning-based text summarization algorithm. The first computing device may include a machine learning engine to train the text summarization algorithm, and/or the first computing device may include a pre-trained text summarization algorithm. The machine learning engine may train the text summarization algorithm using various machine learning techniques such as a regression analysis (e.g., a logistic regression, linear regression, or polynomial regression), k-nearest neighbors, decisions trees, random forests, boosting (e.g., extreme gradient boosting), neural networks, support vector machines, deep learning, reinforcement learning, Bayesian networks, etc. The text summarization algorithm may utilize any standard text summarization techniques, and/or any other suitable machine learning models such as a linear regression model, a logistic regression model, a decision tree, a neural network, a hyperplane, and/or any combinations thereof.

More specifically, to train the text summarization algorithm, the machine learning engine may receive training data including a plurality of sets of navigation instructions corresponding to navigation sessions, a plurality of sets of contextual data received from the user devices (e.g., devices 102, 122) and/or from a navigation server (e.g., traffic data, weather data), and at least one navigation instruction generated based upon each set of navigation instructions and contextual data. While the training data discussed herein includes navigation instructions, contextual data, and at least one navigation instruction received from the user devices, this is merely an example for ease of illustration only. The training data may include any number of navigation instructions, contextual data, and at least one navigation instruction received from any number of users (e.g., additional users utilizing aspects of the present disclosure).

Moreover, while generating the at least one navigation instruction is described within the context of a machine learning environment, it is to be appreciated that generating the at least one navigation instruction may occur without a machine learning process. For example, the first computing device may determine at least one navigation instruction based on a relational database, weighting logic, heuristic rules, grammar, and/or any other suitable algorithmic architecture.

In some embodiments, the at least one navigation instruction may include (i) a first navigation instruction output more frequently than a corresponding at least one second navigation instruction, (ii) a second navigation instruction output at a higher level of detail than the corresponding at least one second navigation instruction, (iii) a third navigation instruction output with traffic information not included in the corresponding at least one second navigation instruction, or (iv) a fourth navigation instruction output with potential stop-off points along the navigation route that are not included in the corresponding at least one second navigation instruction.

For example, the set of navigation instructions may include a navigation instruction for the driver to turn right in one-hundred meters, to be audibly communicated to the driver once when the vehicle is one-hundred meters away from the right turn. The at least one navigation instruction may visibly display to a user of the first computing device (e.g., a passenger) that the upcoming right turn is one-hundred meters away when the vehicle is one-hundred meters away from the right turn. Additionally, the at least one navigation instruction may visibly display to the user that the upcoming right turn is fifty meters away, twenty meters away, and that the driver should turn right now once the vehicle reaches those respective distances from the right turn. Thus, the at least one navigation instruction may provide frequent updates to the user of the first computing device of the upcoming turn, while the driver may receive a single audible instruction well ahead of the right turn. In this manner, the driver may receive a sufficient amount of information related to the navigation route in order to successfully follow the navigation route without being unduly distracted by the navigation instructions. The additional information provided as part of the at least one navigation instruction may be communicated by the user to the driver as necessary to ensure the navigation instructions are followed.

Additionally or alternatively, the navigation server may label portions of the navigation instructions to allow the first computing device, the second computing device, and/or the navigation server to determine instructions for inclusion in the first set of navigation instructions and the second set of navigation instructions. For example, the navigation server may include an instruction stating "Turn right in 100 meters at the intersection with a large tree on the corner" in the set of navigation instructions for transmission to the first and second computing devices. The navigation server may also label the "Turn right in 100 meters" portion of the navigation instruction as "essential" and may label the "at the intersection with a large tree on the corner" portion of the navigation instructions as "optional." Accordingly, the first computing device may receive the set of navigation instructions, include the portion labeled as "essential" in the first set of navigation instructions for display to the driver, and may include the portions labeled as "essential" and "optional" in the second set of navigation instructions for display to a passenger.

At block 708, the first computing device may present the one or more first navigation instructions to a user of the first computing device. The first computing device may present the one or more first navigation instructions via a display of the first computing device, via a speaker of the first computing device, and/or through any other suitable means. In some embodiments, the first computing device may visually display at an interface of the first computing device the at least one or more of the first navigation instructions to a passenger of the vehicle without audibly communicating the at least one of the one or more first navigation instructions to the passenger. Moreover, the second computing device may audibly communicate the at least one of the one or more second navigation instructions to a driver of the vehicle.

In some embodiments, the first computing device may receive a request from a passenger to modify one or more aspects of the navigation route. The first computing device may also modify the one or more aspects of the navigation route in the shared navigation session based upon consent of a driver associated with the second computing device. For example, the first computing device may receive a request from a passenger in the form of an interaction with the first computing device to modify the destination of the current navigation route. Once the passenger identifies the location the passenger intends as the updated destination of the navigation route, the first computing device may transmit an indication of the proposed updated destination to the second computing device. The second computing device may audibly prompt or otherwise indicate to the driver the proposed updated destination, to which the driver may audibly or otherwise respond to the prompt. If the driver accepts the proposed updated destination, the second computing device may update the navigation route to include the updated destination, and may forward the updated synchronized route data to the first computing device. If the driver does not accept the proposed updated destination, the second computing device may not update the navigation route, and may not transmit any updated synchronized route data to the first computing device.

In some embodiments, the first computing device and the second computing device may display the synchronized route data according to different display configurations. The second computing device may display the synchronized route data at a second interface of the second computing device in accordance with one or more second display configurations. The first computing device may display the synchronized route data at a first interface of the first computing device in accordance with one or more first display configurations. In these embodiments, at least one display configuration of the one or more first display configurations is different from each of the one or more second display configurations.

Generally, the first and second display configurations may include any settings governing the display of indications, text, videos, pictures, symbols, and/or other graphical depictions rendered by the first and second computing devices (e.g., as included as part of the graphical rendering 606). More specifically, the at least one display configuration may include at least one of (i) a first perspective configuration of the navigation route displayed on the first computing device that is different from a second perspective configuration of the navigation route displayed on the second computing device or (ii) a first stop-off point display configuration of the first computing device that is different from a second stop-off point display configuration of the second computing device.

A perspective configuration may generally refer to an angle, orientation, and/or distance at which a computing device renders the navigation route on the display of the computing device. For example, the first computing device may display the navigation route according to a first perspective configuration that renders the entire navigation route on the display of the first computing device for the benefit of a passenger to evaluate potential alternate routes and examine future conditions prompting a change of the navigation route (e.g., inclement weather along a portion of the navigation route, traffic ahead, etc.). By contrast, the second computing device may display the navigation route according to a second perspective configuration that renders a small portion of the navigation route for the benefit of the driver to understand proximate surroundings and upcoming navigation instructions.

A stop-off point display configuration may generally refer to a level of detail corresponding to proximate POIs provided by a computing device when rendering the navigation route. For example, the first computing device may display the navigation route according to a first stop-off point display configuration that renders all proximate gas stations, restaurants, and hotels on the display of the first computing device for the benefit of a passenger to evaluate potential stop-off points to refuel, eat, and/or sleep. By contrast, the second computing device may display the navigation route according to a second stop-off point display configuration that renders no proximate POIs on the display of the second computing device to avoid potentially distracting the driver with unnecessary and/or unwanted information.

Turning to FIG. 8, a method 800 can be implemented by a first or second computing device (e.g., the first device 102 or the second device 122). The method 800 can be implemented in a set of instructions stored on a computer-readable memory and executable at one or more processors of the first or second computing device (e.g., the processor(s) 104 or the processor(s) 124).

At block 802, one or more processors of a first computing device may present one or more first navigation instructions for a navigation session indicative of a navigation route, where the navigation session includes route data. The first computing device may also receive a request for access to the navigation session from a second computing device at block 804. Accessing the navigation session may take place via a shared navigation session, in which both the first computing device and the second computing device receive and display synchronized route data.

At block 806, the first computing device may provide access to the second computing device to the shared navigation session. Once the first computing device has provided access to the second computing device, or as part of the first computing device providing access to the second computing device, the first computing device may transmit the route data to the second computing device at block 808.

At block 810, the first computing device may obtain one or more second navigation instructions to be output at the second computing device. The one or more second navigation instructions may include at least one navigation instruction that augments or is output in a different manner than each of the one or more first navigation instructions. Once obtained, the first computing device may transmit the one or more second navigation instructions to the second computing device for display to a user at block 812.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 700, 800 may include one or more function blocks, modules, individual functions or routines in the form of tangible computer-executable instructions that are stored in a computer-readable storage medium, optionally a non-transitory computer-readable storage medium, and executed using a processor of a computing device (e.g., a server device, a personal computer, a smart phone, a tablet computer, a smart watch, a mobile computing device, or other client computing device, as described herein). The methods 700, 800 may be included as part of any backend server (e.g., a map data server, a navigation server, or any other type of server computing device, as described herein), client computing device modules of the example environment, for example, or as part of a module that is external to such an environment. Though the figures may be described with reference to the other figures for ease of explanation, the methods 700, 800 can be utilized with other objects and user interfaces. Furthermore, although the explanation above describes steps of the methods 700, 800 being performed by specific devices (such as a first computing device or a second computing device), this is done for illustration purposes only. The blocks of the methods 700, 800 may be performed by one or more devices or other parts of the environment.

Aspects of the Present Disclosure

1. A method in a first computing device for providing a passenger access to a shared navigation session initiated by a second computing device, the method comprising: requesting, by one or more processors of a first computing device, access to a shared navigation session synchronized with a navigation session at a second computing device, the navigation session indicative of a navigation route and including route data; in response to receiving access to the shared navigation session, receiving, by the one or more processors, synchronized route data indicative of the navigation route at the second computing device; obtaining, by the one or more processors, one or more first navigation instructions corresponding to the synchronized route data including at least one navigation instruction that augments or is output in a different manner than one or more second navigation instructions output at the second computing device; and outputting, by the one or more processors, the one or more first navigation instructions.

2. The method of aspect 1, wherein obtaining the one or more first navigation instructions further comprises: segmenting, by the one or more processors, a set of navigation instructions into the one or more first navigation instructions and the one or more second navigation instructions, wherein at least one of the one or more first navigation instructions corresponds to at least one of the one or more second navigation instructions; and generating, by the one or more processors, the at least one navigation instruction at a different level of detail than a corresponding at least one of the one or more second navigation instructions.

3. The method of any one of aspects 1-2, wherein the one or more processors generate the at least one navigation instruction by using a machine learning-based text summarization algorithm.

4. The method of any one of aspects 1-3, wherein the route data and the synchronized route data is generated at a navigation server, the second computing device is communicatively coupled with the navigation server, and the second computing device relays the synchronized route data from the navigation server to the first computing device.

5. The method of aspect 4, wherein the first computing device is not directly communicatively coupled with the navigation server.

6. The method of any one of aspects 1-5, further comprising: receiving, at the one or processors of the first computing device, a request from a passenger to modify one or more aspects of the navigation route; and modifying, by the one or more processors, the one or more aspects of the navigation route in the shared navigation session based upon consent of a driver associated with the second computing device.

7. The method of any one of aspects 1-6, further comprising: audibly communicating, by a speaker of the second computing device, at least one of the one or more second navigation instructions to a driver of a vehicle; and visually displaying, by a first interface of the first computing device, the at least one of the one or more second navigation instructions to a passenger of the vehicle without audibly communicating the at least one of the one or more second navigation instructions to the passenger of the vehicle.

8. The method of any one of aspects 1-7, further comprising: displaying, by a second interface of the second computing device, the synchronized route data in accordance with one or more second display configurations; and displaying, by a first interface of the first computing device, the synchronized route data in accordance with one or more first display configurations, wherein at least one display configuration of the one or more first display configurations is different from each of the one or more second display configurations.

9. The method of aspect 8, wherein the at least one display configuration includes at least one of (i) a first perspective configuration of the navigation route displayed on the first computing device that is different from a second perspective configuration of the navigation route displayed on the second computing device or (ii) a first stop-off point display configuration of the first computing device that is different from a second stop-off point display configuration of the second computing device.

10. The method of aspect 2, wherein the at least one navigation instruction includes at least one of: (i) a first navigation instruction output more frequently than a corresponding at least one second navigation instruction, (ii) a second navigation instruction output at a higher level of detail than the corresponding at least one second navigation instruction, (iii) a third navigation instruction output with traffic information not included in the corresponding at least one second navigation instruction, or (iv) a fourth navigation instruction output with potential stop-off points along the navigation route that are not included in the corresponding at least one second navigation instruction.

11. The method of any one of aspects 1-10, wherein receiving access to the shared navigation session includes at least one of (i) receiving, by the one or more processors, an invitation transmission from the second computing device, (ii) automatically pairing, by the one or more processors, with the second computing device via a short-range communication protocol, (iii) scanning a visual code displayed on the second computing device including a time limited identifier used for pairing with the second computing device, or (iv) connecting the first computing device to the second computing device with a cable configured to communicatively couple the first computing device to the second computing device.

12. A first computing device for providing a passenger access to a shared navigation session initiated by a second computing device, the first computing device comprising: one or more processors; and a non-transitory computer-readable memory coupled to the one or more processors and storing instructions thereon that, when executed by the one or more processors, cause the first computing device to: request access to a shared navigation session synchronized with a navigation session at a second computing device, the navigation session indicative of a navigation route and including route data, in response to receiving access to the shared navigation session, receive synchronized route data indicative of a navigation route at the second computing device, and obtain one or more first navigation instructions corresponding to the synchronized route data including at least one navigation instruction that augments or is output in a different manner than one or more second navigation instructions output at the second computing device; and present the one or more first navigation instructions.

13. The first computing device of aspect 12, wherein the instructions, when executed by the one or more processors, further cause the first computing device to: segment a set of navigation instructions into the one or more first navigation instructions and the one or more second navigation instructions, wherein at least one of the one or more first navigation instructions corresponds to at least one of the one or more second navigation instructions; and generate the at least one navigation instruction at a different level of detail than a corresponding at least one of the one or more second navigation instructions.

14. The first computing device of aspect 13, wherein the instructions, when executed by the one or more processors, further cause the first computing device to generate the at least one navigation instruction by using a machine learning-based text summarization algorithm.

15. The first computing device of any one of aspects 12-14, wherein the synchronized route data is generated at a navigation server, the second computing device is communicatively coupled with the navigation server, and the second computing device relays the synchronized route data from the navigation server to the first computing device.

16. The first computing device of aspect 15, wherein the first computing device is not directly communicatively coupled with the navigation server.

17. A method in a first computing device for providing a passenger access to a shared navigation session initiated by the first computing device, the method comprising: outputting, by one or more processors of the first computing device, one or more first navigation instructions for a navigation session indicative of a navigation route and including route data; receiving, by one or more processors from a second computing device, a request for access to the navigation session via a shared navigation session; providing, by the one or more processors, access to the second computing device to the shared navigation session; transmitting, by the one or more processors, the route data to the second computing device; obtaining, by the one or more processors, one or more second navigation instructions including at least one navigation instruction that augments or is output in a different manner than each of the one or more first navigation instructions; and transmitting, by the one or more processors, the one or more second navigation instructions to the second computing device.

18. The method of aspect 17, further comprising: segmenting, by the one or more processors, a set of navigation instructions into the one or more first navigation instructions and the one or more second navigation instructions, wherein at least one of the one or more first navigation instructions corresponds to at least one of the one or more second navigation instructions; and generating, by the one or more processors, the at least one navigation instruction at a different level of detail than a corresponding at least one of the one or more first navigation instructions.

19. The method of aspect 18, further comprising generating the at least one navigation instruction by using a machine learning-based text summarization algorithm.

20. The method of any one of aspects 17-19, wherein the route data is generated at a navigation server, the first computing device is communicatively coupled with the navigation server, the first computing device relays the route data from the navigation server to the second computing device, and the second computing device is not directly communicatively coupled with the navigation server.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for providing access to shared navigation sessions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a first computing device for providing a passenger access to a shared navigation session initiated by a second computing device, the method comprising:
    requesting, by one or more processors of a first computing device, access to a shared navigation session synchronized with a navigation session at a second computing device, the navigation session indicative of a navigation route and including route data;
    in response to receiving access to the shared navigation session, receiving, by the one or more processors, synchronized route data indicative of the navigation route at the second computing device;
    obtaining, by the one or more processors, one or more first navigation instructions corresponding to the synchronized route data including at least one navigation instruction that augments one or more second navigation instructions output at the second computing device; and
    outputting, by the one or more processors, the one or more first navigation instructions.

2. The method of claim 1, wherein obtaining the one or more first navigation instructions further comprises:
    segmenting, by the one or more processors, a set of navigation instructions into the one or more first navigation instructions and the one or more second navigation instructions, wherein at least one of the one or more first navigation instructions corresponds to at least one of the one or more second navigation instructions; and
    generating, by the one or more processors, the at least one navigation instruction at a different level of detail than a corresponding at least one of the one or more second navigation instructions.

3. The method of claim 2, wherein the one or more processors generate the at least one navigation instruction by using a machine learning-based text summarization algorithm.

4. The method of claim 1, wherein the route data and the synchronized route data is generated at a navigation server, the second computing device is communicatively coupled with the navigation server, and the second computing device relays the synchronized route data from the navigation server to the first computing device.

5. The method of claim 4, wherein the first computing device is not directly communicatively coupled with the navigation server.

6. The method of claim 1, further comprising:
    receiving, at the one or processors of the first computing device, a request from a passenger to modify one or more aspects of the navigation route; and
    modifying, by the one or processors, the one or more aspects of the navigation route in the shared navigation session based upon consent of a driver associated with the second computing device.

7. The method of claim 1, further comprising:
    audibly communicating, by a speaker of the second computing device, at least one of the one or more second navigation instructions to a driver of a vehicle; and
    visually displaying, by a first interface of the first computing device, the at least one of the one or more second navigation instructions to a passenger of the vehicle without audibly communicating the at least one of the one or more second navigation instructions to the passenger of the vehicle.

8. The method of claim 1, further comprising:
    displaying, by a second interface of the second computing device, the synchronized route data in accordance with one or more second display configurations; and
    displaying, by a first interface of the first computing device, the synchronized route data in accordance with one or more first display configurations, wherein at least one display configuration of the one or more first display configurations is different from each of the one or more second display configurations.

9. The method of claim 8, wherein the at least one display configuration includes at least one of (i) a first perspective configuration of the navigation route displayed on the first computing device that is different from a second perspective configuration of the navigation route displayed on the second computing device or (ii) a first stop-off point display configuration of the first computing device that is different from a second stop-off point display configuration of the second computing device.

10. The method of claim 2, wherein the at least one navigation instruction includes at least one of:
    (i) a first navigation instruction output more frequently than a corresponding at least one second navigation instruction,
    (ii) a second navigation instruction output at a higher level of detail than the corresponding at least one second navigation instruction,
    (iii) a third navigation instruction output with traffic information not included in the corresponding at least one second navigation instruction, or
    (iv) a fourth navigation instruction output with potential stop-off points along the navigation route that are not included in the corresponding at least one second navigation instruction.

11. The method of claim 1, wherein receiving access to the shared navigation session includes at least one of (i)

receiving, by the one or more processors, an invitation transmission from the second computing device, (ii) automatically pairing, by the one or more processors, with the second computing device via a short-range communication protocol, (iii) scanning a visual code displayed on the second computing device including a time limited identifier used for pairing with the second computing device, or (iv) connecting the first computing device to the second computing device with a cable configured to communicatively couple the first computing device to the second computing device.

12. A first computing device for providing a passenger access to a shared navigation session initiated by a second computing device, the first computing device comprising:
   one or more processors; and
   a non-transitory computer-readable memory coupled to the one or more processors and storing instructions thereon that, when executed by the one or more processors, cause the first computing device to:
      request access to a shared navigation session synchronized with a navigation session at a second computing device, the navigation session indicative of a navigation route and including route data,
      in response to receiving access to the shared navigation session, receive synchronized route data indicative of a navigation route at the second computing device, and
      obtain one or more first navigation instructions corresponding to the synchronized route data including at least one navigation instruction that augments one or more second navigation instructions output at the second computing device; and
      present the one or more first navigation instructions.

13. The first computing device of claim 12, wherein the instructions, when executed by the one or more processors, further cause the first computing device to:
   segment a set of navigation instructions into the one or more first navigation instructions and the one or more second navigation instructions, wherein at least one of the one or more first navigation instructions corresponds to at least one of the one or more second navigation instructions; and
   generate the at least one navigation instruction at a different level of detail than a corresponding at least one of the one or more second navigation instructions.

14. The first computing device of claim 13, wherein the instructions, when executed by the one or more processors, further cause the first computing device to generate the at least one navigation instruction by using a machine learning-based text summarization algorithm.

15. The first computing device of claim 12, wherein the synchronized route data is generated at a navigation server, the second computing device is communicatively coupled with the navigation server, and the second computing device relays the synchronized route data from the navigation server to the first computing device.

16. The first computing device of claim 15, wherein the first computing device is not directly communicatively coupled with the navigation server.

17. A method in a first computing device for providing a passenger access to a shared navigation session initiated by the first computing device, the method comprising:
   outputting, by one or more processors of the first computing device, one or more first navigation instructions for a navigation session indicative of a navigation route and including route data;
   receiving, by one or more processors from a second computing device, a request for access to the navigation session via a shared navigation session;
   providing, by the one or more processors, access to the second computing device to the shared navigation session;
   transmitting, by the one or more processors, the route data to the second computing device;
   obtaining, by the one or more processors, one or more second navigation instructions including at least one navigation instruction that augments the one or more first navigation instructions; and
   transmitting, by the one or more processors, the one or more second navigation instructions to the second computing device.

18. The method of claim 17, further comprising:
   segmenting, by the one or more processors, a set of navigation instructions into the one or more first navigation instructions and the one or more second navigation instructions, wherein at least one of the one or more first navigation instructions corresponds to at least one of the one or more second navigation instructions; and
   generating, by the one or more processors, the at least one navigation instruction at a different level of detail than a corresponding at least one of the one or more first navigation instructions.

19. The method of claim 18, further comprising generating the at least one navigation instruction by using a machine learning-based text summarization algorithm.

20. The method of claim 17, wherein the route data is generated at a navigation server, the first computing device is communicatively coupled with the navigation server, the first computing device relays the route data from the navigation server to the second computing device, and the second computing device is not directly communicatively coupled with the navigation server.

* * * * *